(12) United States Patent
Schelter

(10) Patent No.: US 10,814,803 B2
(45) Date of Patent: Oct. 27, 2020

(54) COMPONENT

(71) Applicant: WEIDPLAS GMBH, Küsnacht (CH)

(72) Inventor: Daniel Schelter, Lachen (CH)

(73) Assignee: WEIDPLAS GMBH, Küsnacht (CH)

( * ) Notice: Subject to any disclaimer, the term of this patent is extended or adjusted under 35 U.S.C. 154(b) by 0 days.

(21) Appl. No.: 15/578,857

(22) PCT Filed: Jun. 2, 2016

(86) PCT No.: PCT/EP2016/062521
§ 371 (c)(1),
(2) Date: Dec. 1, 2017

(87) PCT Pub. No.: WO2016/193384
PCT Pub. Date: Dec. 8, 2016

(65) Prior Publication Data
US 2018/0178736 A1   Jun. 28, 2018

(30) Foreign Application Priority Data
Jun. 3, 2015 (EP) .................................... 15170481

(51) Int. Cl.
*B60R 13/04* (2006.01)
*B29C 45/16* (2006.01)
(Continued)

(52) U.S. Cl.
CPC ........ *B60R 13/043* (2013.01); *B29C 45/0025* (2013.01); *B29C 45/1679* (2013.01);
(Continued)

(58) Field of Classification Search
CPC .................................................. B60R 13/043
See application file for complete search history.

(56) References Cited

U.S. PATENT DOCUMENTS

| | | | |
|---|---|---|---|
| 2,298,365 A | 10/1942 | Gits | |
| 4,207,049 A | 6/1980 | Malo | |

(Continued)

FOREIGN PATENT DOCUMENTS

| | | | |
|---|---|---|---|
| DE | 2442227 A1 | 3/1975 | |
| DE | 2461925 A1 | 11/1975 | |

(Continued)

OTHER PUBLICATIONS

International Preliminary Report on Patentability dated Dec. 14, 2017 from the International Bureau in counterpart International Application No. PCT/EP2016/062521.
(Continued)

*Primary Examiner* — Sharon E Payne
(74) *Attorney, Agent, or Firm* — Sughrue Mion, PLLC

(57) ABSTRACT

The invention relates to a component (1) comprising a planar decorative element (4) with a front side (5) and a rear side (6). A cover layer (9, 10) is arranged on each of at least two regions of the front side (5) of the planar decorative element (4), these at least two cover layers (9, 10) being spaced completely apart from one another, and said at least two cover layers (9, 10) and at least one region (12, 14) of the front side (5) of the planar decorative element (4) together forming a visible side (2) of the component (1).

19 Claims, 14 Drawing Sheets

(51) Int. Cl.
  *B29C 45/17* (2006.01)
  *F21V 3/06* (2018.01)
  *B29C 45/00* (2006.01)
  *B32B 27/08* (2006.01)
  *B29L 31/30* (2006.01)
  *B29L 31/00* (2006.01)

(52) U.S. Cl.
  CPC ............ *B29C 45/174* (2013.01); *B32B 27/08* (2013.01); *B60R 13/04* (2013.01); *F21V 3/062* (2018.02); *B29K 2995/0025* (2013.01); *B29K 2995/0029* (2013.01); *B29L 2031/30* (2013.01); *B29L 2031/747* (2013.01); *B32B 2307/41* (2013.01); *B32B 2307/414* (2013.01); *B32B 2605/00* (2013.01)

(56) References Cited

U.S. PATENT DOCUMENTS

| | | | |
|---|---|---|---|
| 4,220,681 A * | 9/1980 | Narita | B60R 13/04 293/126 |
| 4,260,655 A | 4/1981 | Zoller | |
| 4,605,575 A | 8/1986 | Auld | |
| 4,668,460 A | 5/1987 | Ongena | |
| 4,783,298 A | 11/1988 | Oda | |
| 4,823,434 A | 4/1989 | Inagaki | |
| 4,921,669 A | 5/1990 | Vetter | |
| 4,938,825 A | 7/1990 | MacDonald | |
| 5,174,933 A | 12/1992 | Toh | |
| 5,480,688 A | 1/1996 | Kaumeyer | |
| 5,525,179 A | 6/1996 | Stickling | |
| 5,698,276 A | 12/1997 | Mirabitur | |
| 5,902,534 A | 5/1999 | Fujishiro | |
| 6,004,498 A | 12/1999 | Fujii | |
| 6,180,043 B1 | 1/2001 | Yonemochi | |
| 6,328,920 B1 | 12/2001 | Uchiyama | |
| 6,558,599 B1 | 5/2003 | Bethune | |
| 6,676,877 B2 | 1/2004 | Thompson | |
| 6,756,003 B2 | 6/2004 | Kieltyka | |
| 6,884,056 B2 | 4/2005 | Thompson | |
| 7,478,854 B2 | 1/2009 | Cowelchuk | |
| 7,674,414 B2 | 3/2010 | Neitzke | |
| 7,947,208 B2 | 5/2011 | Kimura | |
| 9,139,242 B2 | 9/2015 | Weiss | |
| 2003/0090035 A1 | 5/2003 | Mori | |
| 2004/0017023 A1 | 1/2004 | Shoemann | |
| 2004/0201132 A1 | 10/2004 | Okahara | |
| 2005/0116384 A1 | 6/2005 | Hyuga | |
| 2006/0076712 A1 | 4/2006 | Yonemochi | |
| 2007/0148411 A1 | 6/2007 | Yamada | |
| 2007/0224382 A1 | 9/2007 | Cowelchuk | |
| 2008/0095992 A1 * | 4/2008 | Hirschfelder | B29C 45/14811 428/200 |
| 2008/0265459 A1 | 10/2008 | Gasworth | |
| 2008/0286537 A1 | 11/2008 | Lafaux | |
| 2008/0317893 A1 | 12/2008 | Gruber | |
| 2010/0040726 A1 | 2/2010 | Okahara | |
| 2010/0237536 A1 | 9/2010 | Horinaka | |
| 2011/0121547 A1 | 5/2011 | Nogaret | |
| 2011/0272851 A1 | 11/2011 | Hayes | |
| 2012/0237725 A1 * | 9/2012 | Stossel | B60R 13/02 428/139 |
| 2013/0101799 A1 | 4/2013 | Trier | |

FOREIGN PATENT DOCUMENTS

| | | |
|---|---|---|
| DE | 2753870 A1 | 6/1978 |
| DE | 29 10 320 A1 | 6/1980 |
| DE | 3539088 A1 | 5/1986 |
| DE | 3816855 A1 | 11/1989 |
| DE | 3938891 A1 | 5/1990 |
| DE | 4023209 A1 | 1/1991 |
| DE | 4101106 A1 | 7/1992 |
| DE | 4104647 A1 | 8/1992 |
| DE | 4316154 C1 | 4/1994 |
| DE | 3689549 T2 | 7/1994 |
| DE | 4301444 C2 | 8/1995 |
| DE | 69029651 T2 | 9/1997 |
| DE | 29714358 U1 | 10/1997 |
| DE | 19833039 A1 | 1/2000 |
| DE | 4336878 C2 | 10/2000 |
| DE | 10009343 A1 | 8/2001 |
| DE | 19534982 C2 | 6/2002 |
| DE | 10143883 A1 | 3/2003 |
| DE | 10224381 A1 | 12/2003 |
| DE | 10334337 A1 | 4/2004 |
| DE | 10309814 B3 | 9/2004 |
| DE | 102004044415 A1 | 3/2006 |
| DE | 102004051334 A1 | 5/2006 |
| DE | 102005050164 A1 | 6/2006 |
| DE | 102004062510 A1 | 7/2006 |
| DE | 102005028355 A1 | 12/2006 |
| DE | 102005029626 A1 | 1/2007 |
| DE | 102005061451 A1 * | 7/2007 ..... B29C 2037/0035 |
| DE | 102006005303 A1 | 8/2007 |
| DE | 69933729 T2 | 9/2007 |
| DE | 102006016200 A1 | 10/2007 |
| DE | 102006048252 B3 | 12/2007 |
| DE | 102007020418 A1 | 10/2008 |
| DE | 102007021679 A1 | 11/2008 |
| DE | 102007024529 A1 | 11/2008 |
| DE | 102007041546 B4 | 5/2009 |
| DE | 202009009389 U1 | 1/2010 |
| DE | 102009004985 A1 | 7/2010 |
| DE | 102009005609 B3 | 7/2010 |
| DE | 102009016432 A1 | 10/2010 |
| DE | 102009026070 A1 | 12/2010 |
| DE | 102010039270 A1 | 2/2011 |
| DE | 102009060552 A1 | 6/2011 |
| DE | 102010013700 A1 | 8/2011 |
| DE | 10 2010 030 911 A1 | 1/2012 |
| DE | 102010063751 A1 | 6/2012 |
| DE | 202010018695 U1 | 11/2012 |
| DE | 102011119686 A1 | 5/2013 |
| DE | 102011122615 A1 | 6/2013 |
| DE | 102011122615 A1 | 6/2013 |
| DE | 102012023066 A1 | 5/2014 |
| DE | 102012023608 A1 | 6/2014 |
| EP | 30827 A1 | 6/1981 |
| EP | 45421 A2 | 2/1982 |
| EP | 60721 A1 | 9/1982 |
| EP | 247708 A2 | 12/1987 |
| EP | 282392 A1 | 9/1988 |
| EP | 472312 A2 | 2/1992 |
| EP | 476228 A1 | 3/1992 |
| EP | 482270 A1 | 4/1992 |
| EP | 492532 A2 | 7/1992 |
| EP | 197496 B1 | 1/1994 |
| EP | 0 845 344 A1 | 6/1998 |
| EP | 845344 A1 | 6/1998 |
| EP | 934808 A2 | 8/1999 |
| EP | 3049929 A1 | 6/2003 |
| EP | 1177949 A1 | 2/2005 |
| EP | 1666225 A1 | 6/2005 |
| EP | 1612024 A1 | 1/2006 |
| EP | 1640134 A1 | 3/2006 |
| EP | 1810811 A1 | 7/2007 |
| EP | 2000278 A1 | 12/2008 |
| EP | 2113429 A1 | 11/2009 |
| EP | 2012992 B1 | 2/2012 |
| EP | 2620270 A1 | 7/2013 |
| EP | 2 684 744 A1 | 1/2014 |
| EP | 2684744 A1 | 1/2014 |
| FR | 2729886 A1 | 8/1996 |
| GB | 2271956 A | 5/1994 |
| JP | 60219035 A | 11/1985 |
| JP | H06134805 A | 5/1994 |
| JP | 6270202 | 9/1994 |
| JP | 6328505 | 11/1994 |
| JP | H06328505 A | 11/1994 |
| JP | 7112450 | 5/1995 |
| JP | 8127893 | 5/1996 |
| JP | H08281701 A | 10/1996 |

(56) References Cited

FOREIGN PATENT DOCUMENTS

| | | |
|---|---|---|
| JP | 9052254 | 2/1997 |
| JP | 9052255 | 2/1997 |
| JP | H0952255 A | 2/1997 |
| JP | 1110921 A | 1/1999 |
| JP | H1134068 A | 2/1999 |
| JP | 2001026036 A | 1/2001 |
| JP | 2002018895 A | 1/2002 |
| JP | 2002160256 A | 6/2002 |
| JP | 2002172654 A | 6/2002 |
| JP | 2002240087 A | 8/2002 |
| JP | 2002273758 A | 9/2002 |
| JP | 2003159724 A | 6/2003 |
| JP | 2005161683 A | 6/2005 |
| JP | 2005254606 A | 9/2005 |
| JP | 2005335200 A | 12/2005 |
| JP | 2006289794 A | 10/2006 |
| JP | 2006297713 A | 11/2006 |
| JP | 2007190722 A | 8/2007 |
| JP | 2008073861 A | 4/2008 |
| JP | 2009298005 A | 12/2009 |
| JP | 2010167662 A | 8/2010 |
| JP | 2011189695 A | 9/2011 |
| JP | 2012056294 A | 3/2012 |
| JP | 5318527 B2 | 10/2013 |
| PK | 2007125832 A | 5/2007 |
| WO | 9413497 A1 | 6/1994 |
| WO | 9823431 A1 | 6/1998 |
| WO | 9823432 A1 | 6/1998 |
| WO | 9920464 | 4/1999 |
| WO | 3084730 A1 | 10/2003 |
| WO | 4099480 | 11/2004 |
| WO | 7104548 | 9/2007 |
| WO | 8088841 | 7/2008 |
| WO | 8134621 | 11/2008 |
| WO | 8134771 | 11/2008 |
| WO | 9053130 | 4/2009 |
| WO | 10064733 A1 | 6/2010 |
| WO | 10083959 A1 | 7/2010 |
| WO | 10112785 A1 | 10/2010 |
| WO | 2011076728 A1 | 6/2011 |

OTHER PUBLICATIONS

International Search Report for PCT/EP2016/062521, dated Aug. 31, 2016.

* cited by examiner

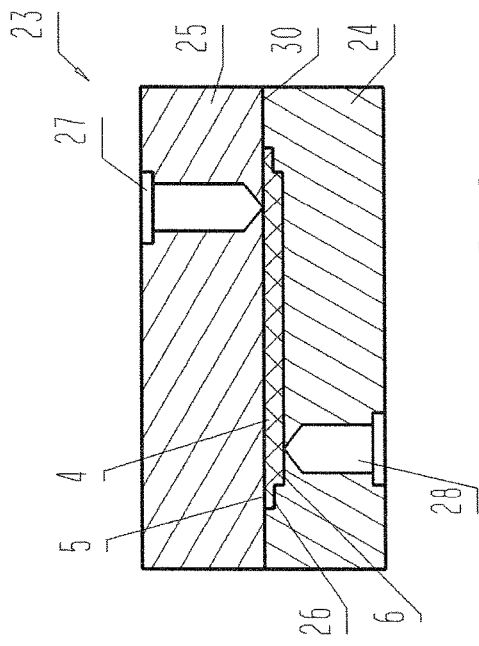
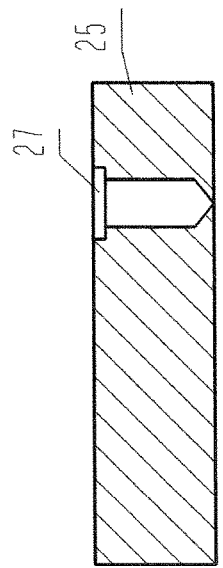
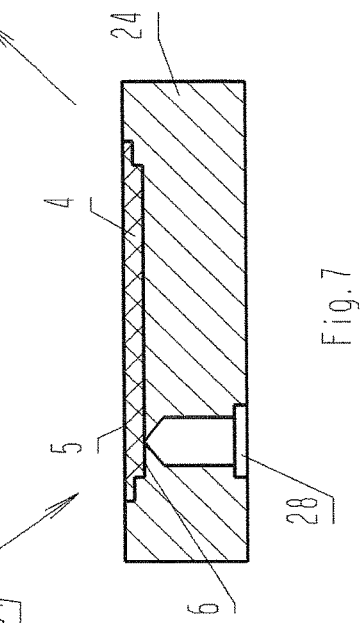
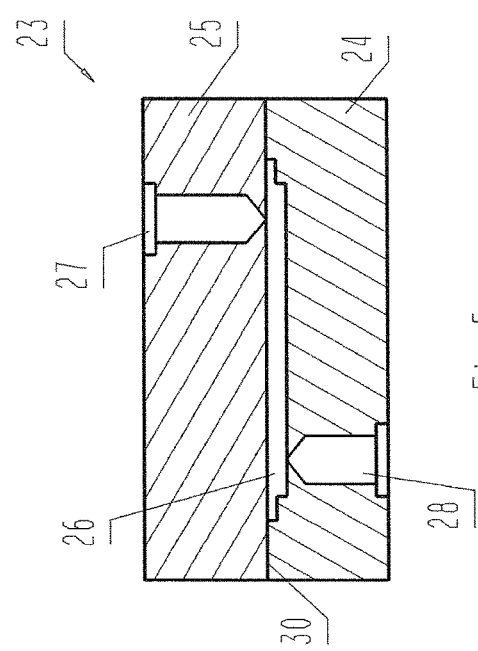
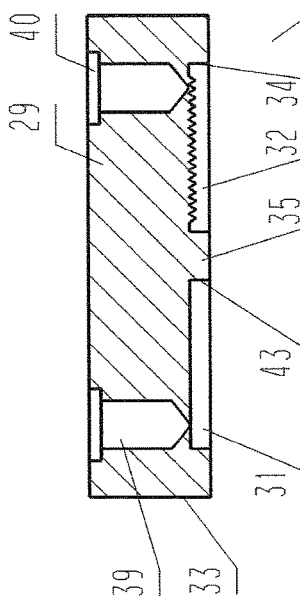

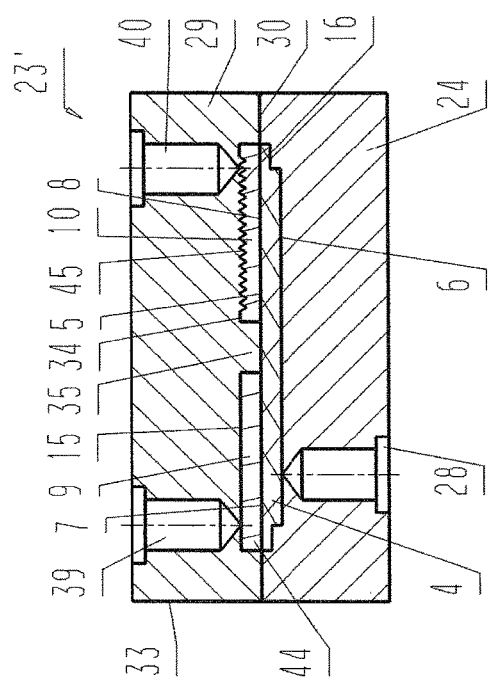
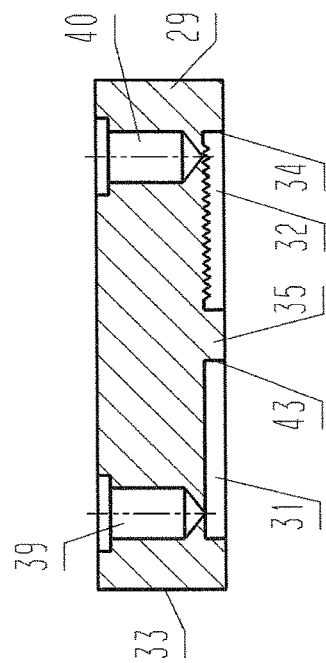
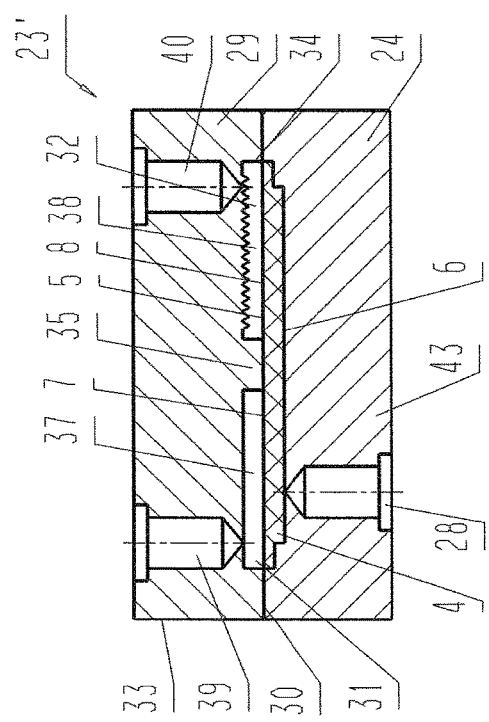
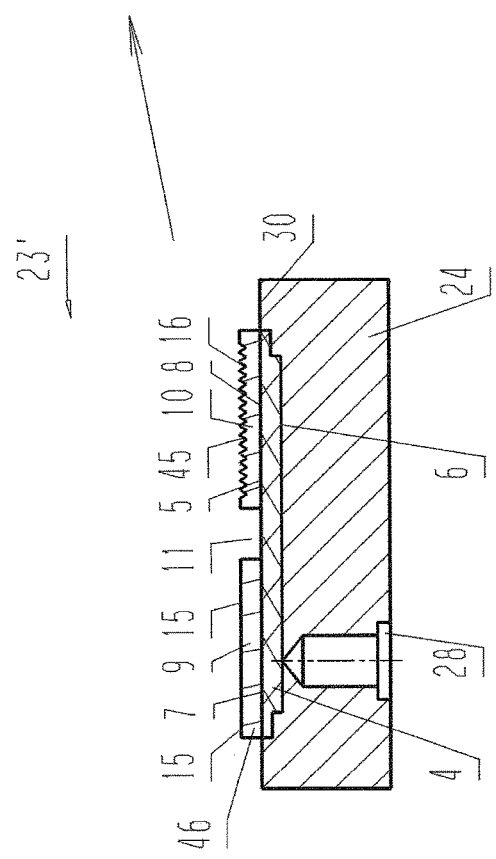

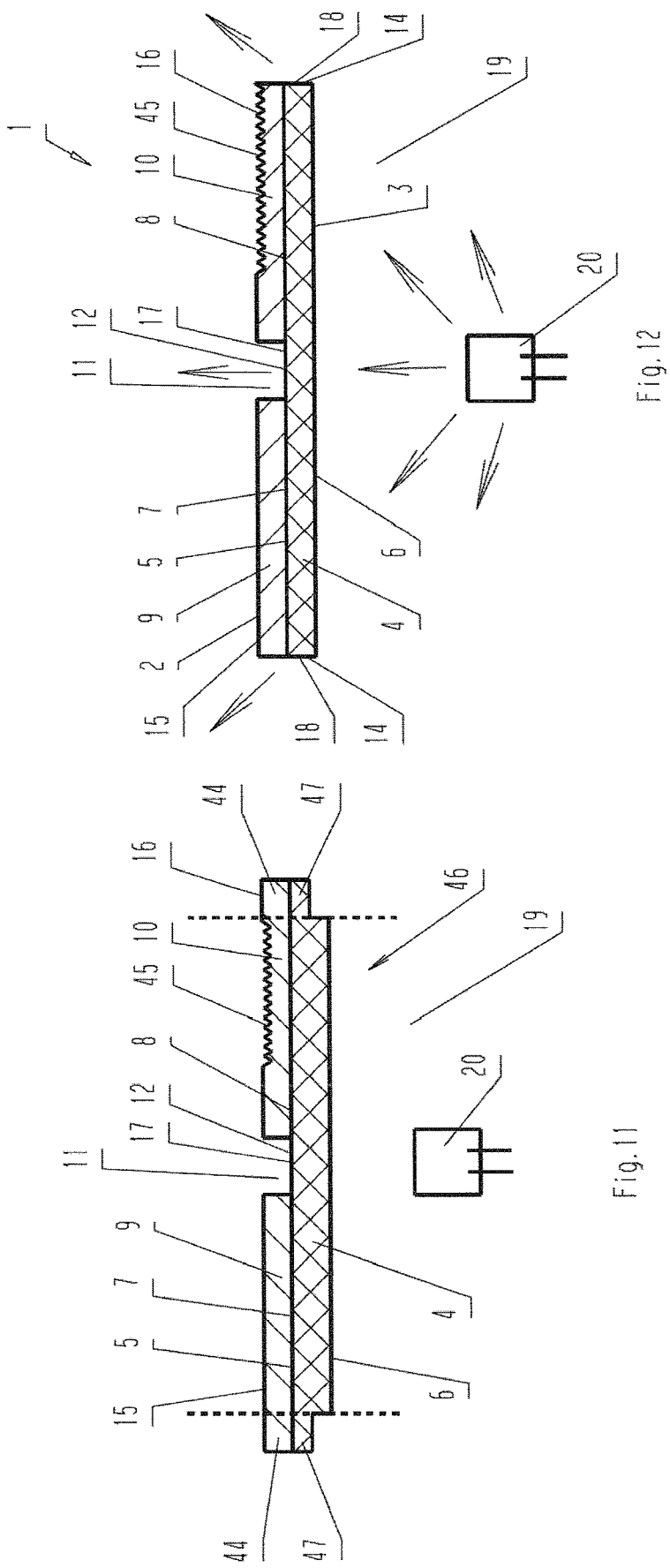

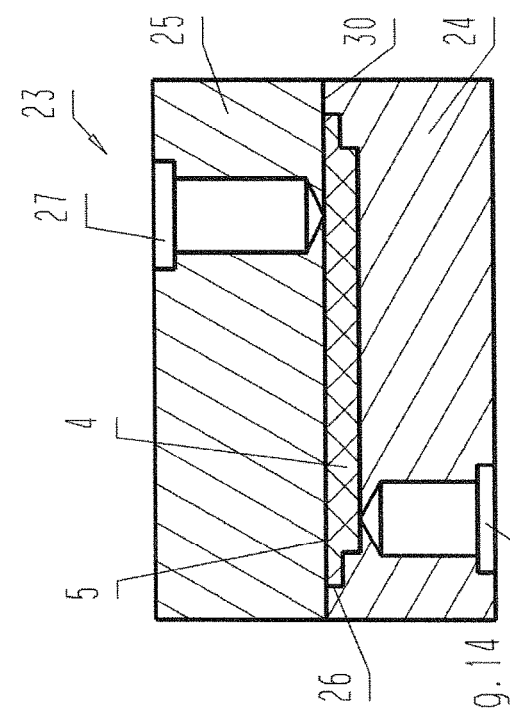
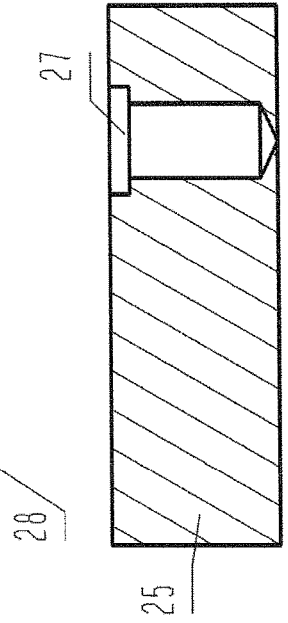
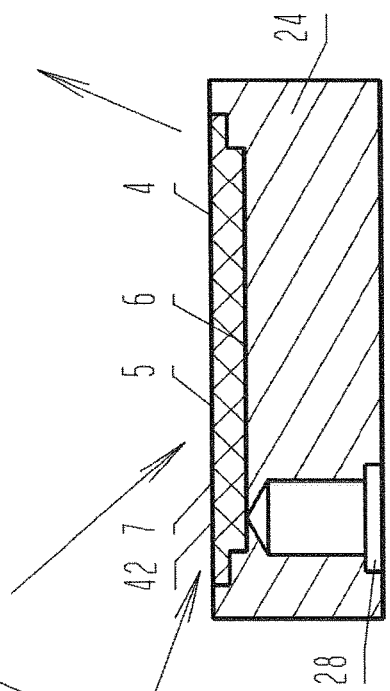
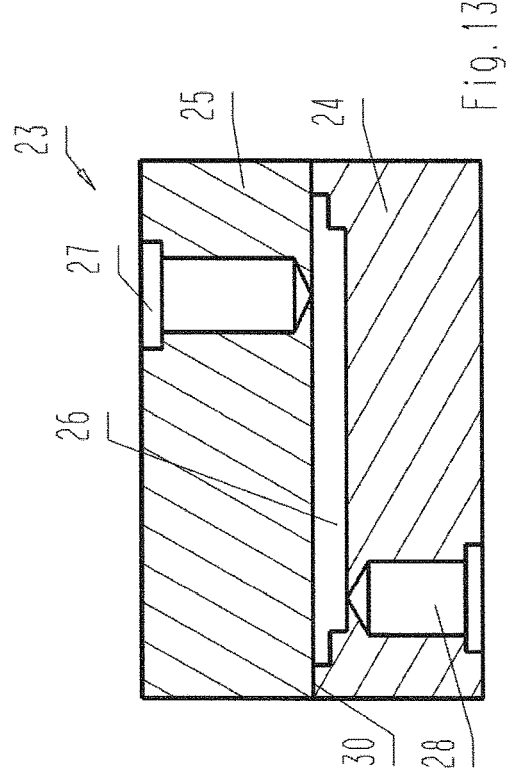
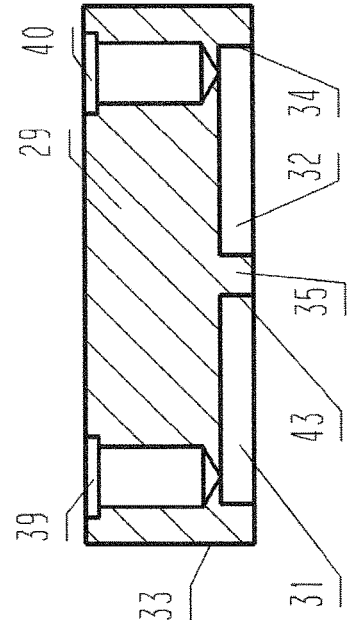

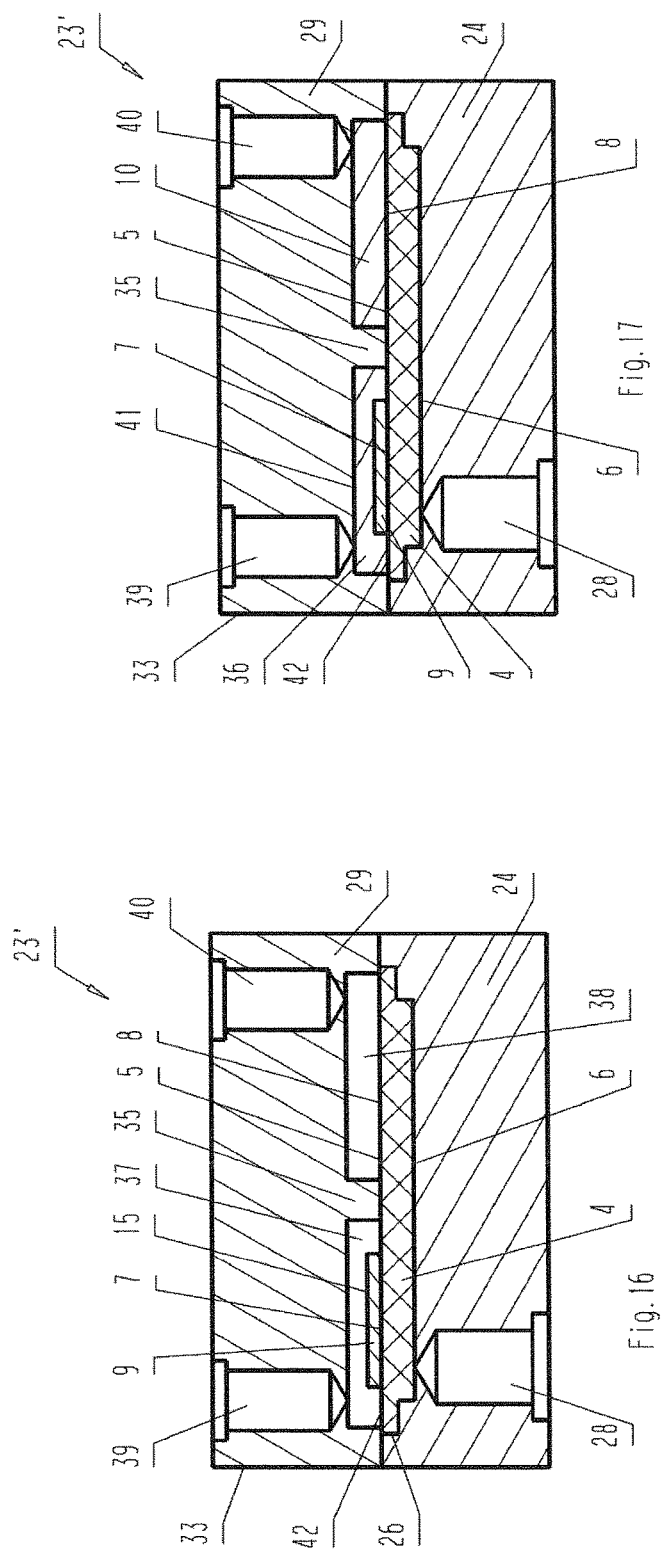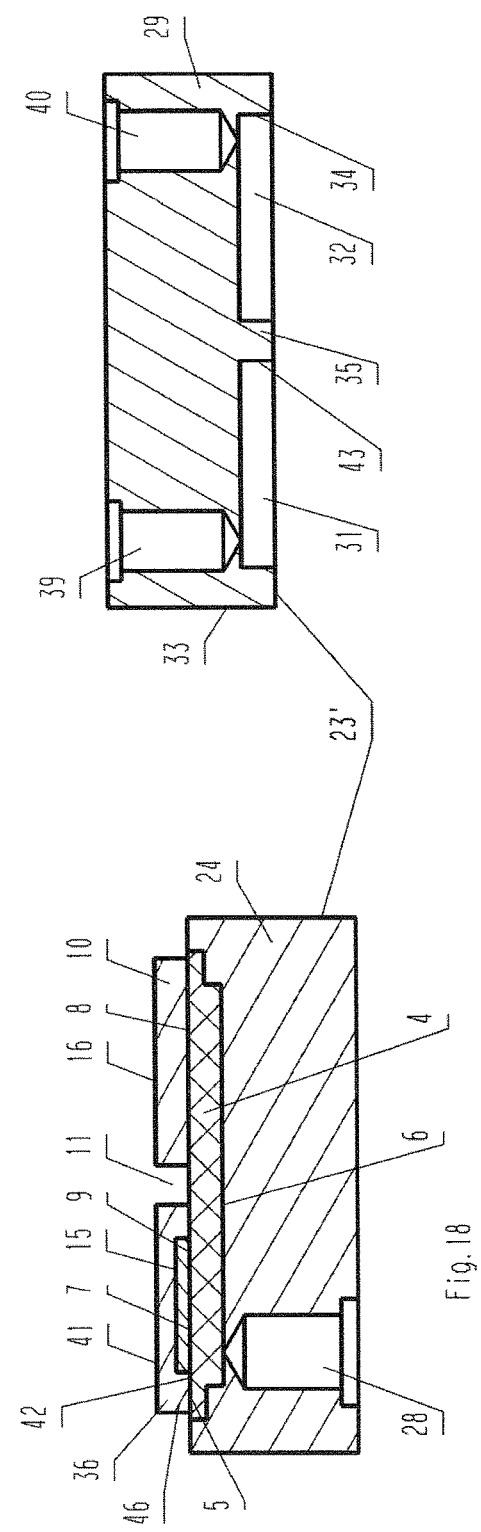

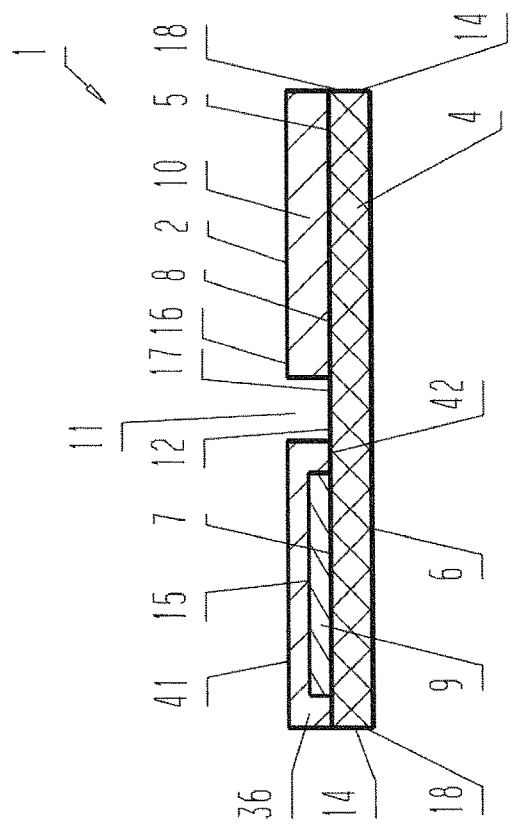
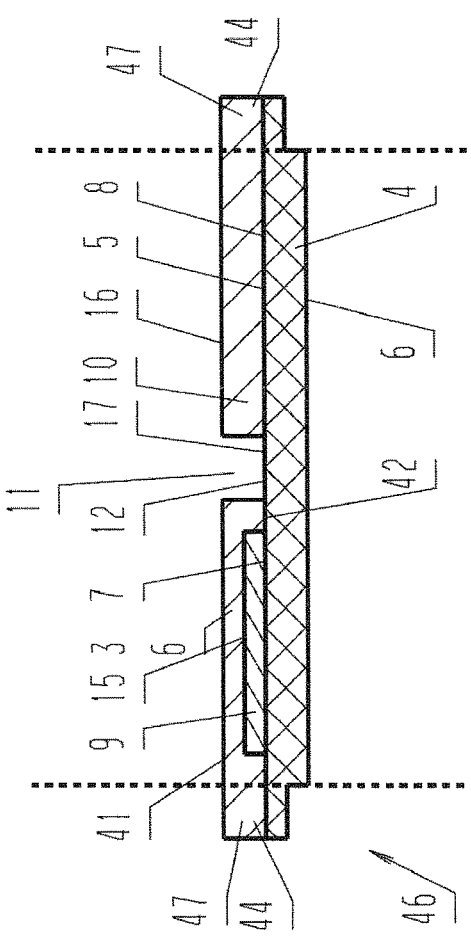

COMPONENT

CROSS REFERENCE TO RELATED APPLICATIONS

This application is a National Stage of International Application No. PCT/EP2016/062521 filed Jun. 2, 2016, claiming priority based on European Patent Application No. 15 170 481.4 filed Jun. 3, 2015, the contents of all of which are incorporated herein by reference in their entirety.

TECHNICAL FIELD

The present invention relates to a component and to a method for the production of a component of this type.

PRIOR ART

EP 2 684 744 A1 describes a trim part for motor vehicles, having a support part from a thermoplastic plastics part that is produced by the injection-molding method and a cover layer. The cover layer forms the visible side of the trim part. The cover layer is produced by flooding the support part such that the cover layer is formed by a single contiguous layer which thus forms a single contiguous surface and which has a single color. In the case of this trim part that is produced as described, it is disadvantageous that the design of the visible side of the trim part is restricted, in particular by virtue of the manner in which the trim part is produced.

DE 10 2010 030 911 A1 discloses a molded part for a motor vehicle, having a support part and a cover part that is made from a sheet metal and has recesses. A foil which extends across the recesses of the cover part and on account thereof together with the cover part forms a visible face is disposed between the cover part and the support part.

U.S. Pat. No. 4,260,655 shows a trim strip for motor vehicles. The trim strip has a body that is produced by means of extrusion, and chromium-like or other decorative coating materials are attached to the visible side of said body.

A cover strip for motor vehicles in which a thin metal layer is extrusion-coated by soft PVC resin in such a manner that the metal layer is partially exposed is described in DE 29 10 320.

PRESENTATION OF THE INVENTION

It is thus an object of the present invention to achieve a component of the type mentioned of which the visible side is designed in a more diverse manner.

In order to achieve this object, the present invention provides a component comprising a two-dimensionally extending decorative element having a front side and a rear side, wherein in each case a cover layer is disposed on at least two regions of the front side, wherein the at least two cover layers, in particular in the plan view of a visible side of the component, are completely spaced apart from one another, and wherein the at least two cover layers and at least one region of the front side of the two-dimensionally extending decorative element conjointly form the visible side of the component.

By virtue of the complete spacing of the at least two cover layers, or by virtue of a continuous gap between the at least two cover layers, respectively, a region of the front side of the two-dimensionally extending decorative element is disposed in a continuous manner between the at least two cover layers, and the at least two cover layers and at least one region of the front side of the two-dimensionally extending decorative element thus conjointly form the visible side of the component in the case of the component according to the invention. Such a component that is configured according to the invention has the advantage that the component is configured in a more diverse and thus more esthetic manner. A more diverse and more esthetic design embodiment of the component according to the invention is provided in particular because the at least two cover layers form at least two surfaces of the visible side of the component, and the at least one region of the front side of the two-dimensionally extending decorative element forms at least one surface of the visible side of the component, and at least three surfaces thus conjointly form the visible side of the component. The number of surfaces which form the visible side of the component and are individually designable in the case of the component according to the invention is thus larger than in the case of trim parts of the prior art. Of these at least three surfaces, at least two surfaces are configured in a different manner, for example. In this context, the feature "configured in a different manner" means that at least the colors of the surfaces, at least the structuring of the surfaces, or at least the materials from which the surfaces are formed, are different, for example. Of course, the surfaces can be mutually different also by way of at least two of the mentioned parameters "color", "structuring", "material", for example.

The feature of the decorative element of the component being configured in a two-dimensionally extending manner means that the decorative element along two dimensions is dimensioned so as to be substantially larger, in particular many times larger, than along a third dimension which typically extends perpendicularly to the two-dimensionally extending expansion of the front side of the decorative element. The two-dimensionally extending decorative element is configured so as to be tape-shaped, in particular as a tape, for example.

According to a refinement of the invention, the at least two regions are spaced apart from one another by at least 0.3 millimeter, preferably at least 1 millimeter, more preferably at least 2 millimeters. The maximum spacing is preferably 10 millimeters. In the case of these dimensions, a portion of the at least one region of the front side of the two-dimensionally extending decorative element that is disposed between the at least two cover layers is particularly well visible in particular in the plan view of the visible side of the component, and can thus be esthetically effective in a particularly positive manner.

According to a refinement of the invention, the at least two cover layers have a thickness D in the range from 100 micrometers to 1000 micrometers, preferably in the range from 200 micrometers to 800 micrometers, more preferably in the range from 400 to 600 micrometers, even more preferably in the range from 450 micrometers to 550 micrometers. Cover layers having the thicknesses mentioned, in particular cover layers having a thickness in the even more preferred range, have a good resistance to scratching and, moreover, are readily producible in particular by means of an injection-molding tool. The ready producibility is provided because, in a cavity, in particular of an injection-molding tool, in which the cover layer is to be formed and which has a height which corresponds approximately to the thickness of the cover layer to be formed, the material for forming the cover layer that is incorporated into the cavity by virtue of the height mentioned can readily flow, and the cavity can therefore be readily and completely filled with the material.

According to a refinement of the invention, at least one cover layer of the at least two cover layers is produced from an opaque material. Preferably, all cover layers are produced from an opaque material. The opaque material is preferably metal or plastics, more preferably plastics. This refinement of the invention offers the advantage that the region of the two-dimensionally extending decorative element that is in each case disposed below an opaque cover layer is covered by the respective opaque cover layer and is thus not visible, and the two-dimensionally extending decorative element can thus be produced from a comparatively lower grade and thus more cost-effective material.

According to a refinement of the invention, at least one cover layer of the at least two cover layers is produced from plastics. The plastics can be a lacquer, for example, such as a scratch-resistant lacquer or a soft lacquer, for example.

According to a refinement of the invention, at least one respective cover layer of the at least two cover layers is configured so as to be at least partially raised in relation to a region of the front side of the two-dimensionally extending decorative element, said region, in particular when viewed in the plan view of the visible side of the component, at least partially bordering the respective cover layer. Preferably, all cover layers are configured so as to be at least partially raised relative to a region of the front side of the two-dimensionally extending decorative element. This refinement of the invention offers the advantage that the freedom of design increases on account of the at least partially raised feature.

According to a refinement of the invention, the cover layers that are disposed on the at least two regions of the front side of the two-dimensionally extending decorative element conjointly cover at least 50% of the area of the front side of the two-dimensionally extending decorative element, preferably at least 75% of the area of the front side of the two-dimensionally extending decorative element, more preferably at least 95% of the area of the front side of the two-dimensionally extending decorative element. This refinement of the invention offers the advantage that the visible side of the component achieves a particularly esthetic effect in the case of the percentage-wise coverages mentioned of the front side of the two-dimensionally extending decorative element.

According to a refinement of the invention, the two-dimensionally extending decorative element is configured so as to be integral. This refinement of the invention offers the advantage that the component can be produced in a particularly simple manner and has a visually appealing design.

According to a refinement of the invention, the two-dimensionally extending decorative element is produced from plastics. However, the two-dimensionally extending decorative element can, for example, also be produced from a metal, such as, for example, aluminum, steel, or stainless steel, or from another material such as, for example, wood. The wood mentioned is produced, for example, in that the wood is disposed in an autoclave and water vapor is directed into the autoclave, said water vapor acting on the wood. After the removal of the wood that has been processed with the water vapor from the autoclave, the processed wood is formed and then dried. In the case of the two-dimensionally extending decorative element being produced from metal or plastics, the two-dimensionally extending decorative element can be configured as a foil, for example, or as a self-supporting component, for example. In the case of the two-dimensionally extending decorative element being a foil, the foil is preferably configured so as to be flexible. The foil is, for example, a plastics foil, or, for example, a metal foil. The foil can be configured as a functional foil which, for example, has electronics, wherein the electronics are preferably printed onto the foil.

According to a refinement of the invention, the two-dimensionally extending decorative element has a thickness of 1 mm or less.

According to a refinement of the invention, the two-dimensionally extending decorative element is configured so as to be translucent or opaque, preferably translucent. The opaque configuration of the two-dimensionally extending decorative element offers the advantage that a component part of the component that is disposed in the region of the rear side of the two-dimensionally extending decorative element in the plan view of the visible side of the component is not visible and thus does not disturb the esthetics of the visible side of the component. The translucent configuration of the two-dimensionally extending decorative element offers the advantage that light that is emitted from an illumination means that is disposed in the region of the rear side of the two-dimensionally extending decorative element can pass through the two-dimensionally extending decorative element that is configured so as to be translucent and can be perceived on the visible side of the component. In the case of the component having an illumination means and of the two-dimensionally extending decorative element thus being configured so as to be translucent, preferably at least one cover layer of the at least two cover layers, more preferably all cover layers, is produced from an opaque material. A cover layer that is configured so as to be opaque, preferably in the installed state of the component, such as, for example, in the installed state of the component in a motor vehicle, is then preferably at least partially, more preferably completely, surrounded by light that is emitted from the illumination means, which is particularly esthetic. If the opaque cover layers are at least partially, in particular completely, surrounded by light that is emitted from an illumination means that is disposed in a region of the rear side of the two-dimensionally extending decorative element, the at least two opaque cover layers, in particular in the plan view of the visible side of the component, moreover appear as if said cover layers were floating. The two-dimensionally extending decorative element that is configured so as to be translucent is preferably produced from translucent plastics. In the case of the two-dimensionally extending decorative element being produced from metal and configured so as to be translucent, the two-dimensionally extending decorative element preferably has at least one cut-out through which light that is emitted from the illumination means can pass through the two-dimensionally extending decorative element and be emitted from the visible side of the component.

According to a refinement of the invention, at least one fastening means for fastening the component to a motor vehicle is integrally molded to the two-dimensionally extending decorative element, preferably to the rear side of the two-dimensionally extending decorative element, wherein the two-dimensionally extending decorative element is preferably produced from plastics. In the case of the two-dimensionally extending decorative element being produced from plastics, the fastening means by virtue of the integrity is automatically also produced from plastics. In this case, the two-dimensionally extending decorative element and the fastening means are produced from the same plastics. Such a component that is fastenable to the motor vehicle is producible in a particularly simple manner, in particular in the case of the two-dimensionally extending decorative element being produced from plastics.

According to a refinement of the invention, the two-dimensionally extending decorative element and the at least one fastening means are produced from different materials, in particular from different plastics. The at least one fastening means in this case can be molded to the two-dimensionally extending decorative element in particular by bi-component injection molding.

According to a refinement of the invention, an outer region of a periphery of at least one cover layer of the at least two cover layers terminates so as to be flush with a periphery of the two-dimensionally extending decorative element. Preferably, an outer region of a periphery of all cover layers terminates so as to be flush with a periphery of the two-dimensionally extending decorative element. The component is better protected against damage by virtue of the flush termination.

According to a refinement of the invention, the two-dimensionally extending decorative element has a periphery, in particular a circumferential periphery, wherein the periphery has a peripheral surface which forms a part-region of the front side of the two-dimensionally extending decorative element. At least one cover layer of the at least two cover layers herein is advantageously disposed on the peripheral surface. Preferably, at least two cover layers of the at least two cover layers are disposed on the peripheral surface. Particularly advantageously, at least two cover layers of the at least two cover layers terminate so as to be flush with an end face of the two-dimensionally extending decorative element that is formed by the periphery. This refinement of the invention offers the advantage that the component is visually even more appealing and is more resistant in relation to environmental influences.

Preferably, at least one cover layer of the at least two cover layers, additionally to being disposed on the peripheral surface, is disposed on an end face, in particular on a circumferential end face, of the two-dimensionally extending decorative element. More preferably, at least two cover layers of the at least two cover layers, additionally to being disposed on the peripheral surface, are disposed on the end face. These embodiments offer the advantage that the component is even more resistant in relation to environmental influences. The end face of the two-dimensionally extending decorative element preferably connects the front side of the two-dimensionally extending decorative element to the rear side of the two-dimensionally extending decorative element.

Preferably, at least one cover layer of the at least two cover layers, additionally to being disposed on the peripheral surface and on the end face, is disposed on the rear side. More preferably, at least two cover layers of the at least two cover layers, additionally to being disposed on the peripheral surface and on the end face, are disposed on the rear side. These embodiments offer the advantage that the component is extremely resistant in relation to environmental influences.

The material of the cover layer or of the cover layers, respectively, that is disposed on the rear side is preferably configured so as to be translucent or opaque. In the case of the component having an illumination means, the material of the cover layer or of the cover layers, respectively, that is disposed on the rear side is preferably configured so as to be translucent such that the light that is emitted from an illumination means of the component can pass through the material. In the case of the component having an illumination means, the part-region of the cover layer that is disposed on the front side and on the end side, or the part-regions of the cover layers that are disposed on the front side and on the end side, respectively, is/are thus preferably configured so as to be opaque, and the part-region of the cover layer that is disposed on the rear side is preferably configured so as to be translucent, or the part-regions of the cover layers that are disposed on the rear side are preferably configured so as to be translucent, respectively.

According to a refinement of the invention, the component has a protective layer which covers at least a part-region of the visible side of the component. The protective layer is preferably produced from a translucent material. The protective layer is preferably fastened to the visible side of the component in a releasable manner.

According to a refinement of the invention, at least one layer, preferably at least one support layer, is disposed on the rear side of the two-dimensionally extending decorative element, wherein the layer, or the support layer, respectively, is produced from an opaque material or from a translucent material, is preferably produced from a translucent material, wherein the material is preferably plastics. The at least one layer is preferably fastened to the rear side of the two-dimensionally extending decorative element. This refinement of the invention offers the advantage that, by virtue of the at least one layer, two-dimensionally extending decorative elements having a minor thickness can be used for the production of the component without problems, and that such a component furthermore has a sufficient rigidity. Such a two-dimensionally extending decorative element having a comparatively minor thickness can be a foil, for example. Such a foil has a thickness, for example, in the range from 0.05 millimeter to 1 millimeter, preferably in the range from 0.1 millimeter to 0.3 millimeter. The at least one layer preferably has a thickness of 1 millimeter or more. The at least one layer preferably has a maximum thickness of 10 millimeters. In the case of the at least one layer being produced from thermoplastic plastics by injection molding, the at least one layer preferably has a maximum thickness of 10 millimeters since rapid cooling of the at least one layer after production of the latter is still possible in the case of such a thickness.

Preferably, at least one cover layer of the at least two cover layers, additionally to the peripheral surface and to the end face, covers the layer. More preferably, at least two cover layers of the at least two cover layers, additionally to the peripheral surface and to the end face, cover the layer. These embodiments offer the advantage that the component is extremely resistant in relation to environmental influences. In the case of the component having an illumination means, the material of the cover layer or cover layers, respectively, that is disposed on the layer is preferably configured so as to be translucent such that the light that is emitted from an illumination means of the component can pass through the material. In the case of the component having an illumination means, the part-region of the cover layer that is disposed on the front side and on the end side, or the part-regions of the cover layers that are disposed on the front side and on the end side, respectively, is/are thus preferably configured so as to be opaque, and the part-region of the cover layer that is disposed on the layer is preferably configured so as to be translucent, or the part-regions of the cover layers that are disposed on the layer are preferably configured so as to be translucent, respectively.

According to a refinement of the invention, the component comprises at least one illumination means that is disposed in such a manner that the rear side of the two-dimensionally extending decorative element can be backlit by means of the illumination means. The illumination means is preferably disposed in the region of the rear side of the two-dimensionally extending decorative element. The illumination means can be one or a plurality of light-emitting diodes, for example. Also possible is, for example, a light-emitting foil, in particular an electroluminescent foil or an OLED, or a lightbulb. In the case of an illumination means being disposed in the region of the rear side of the two-dimensionally extending decorative element and of the at least one layer being disposed between the illumination means and the rear side of the two-dimensionally extending decorative element in such a manner that the light that is emitted from the illumination means can make its way into the two-dimensionally extending decorative element exclusively by way of the at least one layer, the two-dimensionally extending decorative element is produced from a translucent material and the at least one layer at least in regions, preferably completely, is produced from a translucent material such that the light that is emitted by the illumination means can pass through the at least one layer that is disposed on the rear side of the two-dimensionally extending decorative element and through the two-dimensionally extending decorative element and can be emitted from the visible side of the component. In the case of the component having at least one layer that is disposed on the rear side of the two-dimensionally extending decorative element, any illumination means present can also be disposed between the two-dimensionally extending decorative element and the at least one layer, for example.

The component is preferably configured as a trim strip, an operating element such as, for example, a pushbutton or, particularly preferably, as a foot strip or door-sill strip of a vehicle. The vehicle is preferably a motor vehicle and particularly preferably a road-bound motor vehicle. The component can be provided in the internal region and/or in the external region of the vehicle. However, the component can also be configured, for example, as a trim strip or an operating element of a domestic appliance, such as, for example, of a refrigerator, of a steam cooker, of a washing machine, of an oven, of a hob, of a dishwasher, or of an item of furniture.

Moreover, a method for the production of a component, in particular of a component as has been specified above, is specified, said method comprising the following steps:
providing a two-dimensionally extending decorative element having a front side and a rear side;
disposing in each case a cover layer on at least two regions of the front side of the provided two-dimensionally extending decorative element in such a manner that the at least two cover layers are completely spaced apart from one another and wherein the at least two cover layers and at least one region of the front side of the two-dimensionally extending decorative element conjointly form the visible side of the component.

The method according to the invention offers the advantage that an automated serial production of components which have a visible side that is designed in a more diverse manner is possible by means of the invention.

According to a refinement of the invention, the two-dimensionally extending decorative element having a front side and a rear side is provided by means of an injection-molding method. This refinement of the invention offers the advantage that the component can be produced in a simple and cost-effective manner. The injection-molding method is preferably a variotherm injection-molding method. This offers the advantage that the creation of sink marks on the front side of the two-dimensionally extending decorative element can be avoided during the production of the two-dimensionally extending decorative element. The rear side of the two-dimensionally extending decorative element is preferably impinged with gas during the production of the two-dimensionally extending decorative element by means of the injection-molding method. This offers the advantage that the creation of sink marks on the front side of the two-dimensionally extending decorative element can be avoided during the production of the two-dimensionally extending decorative element. Of course, the two-dimensionally extending decorative element can also be a prefabricated two-dimensionally extending decorative element. A prefabricated two-dimensionally extending decorative element is, for example, a two-dimensionally extending decorative element which, for example, is pre-cut, pre-formed, etc.

According to a refinement of the invention, the disposal of in each case a cover layer on at least two regions of the front side of the provided two-dimensionally extending decorative element is carried out as follows, or comprises the following steps, respectively:
disposing at least one cover element on the at least two regions of the provided two-dimensionally extending decorative element, such that the at least one cover element in each case conjointly with each of the at least two regions forms a cavity;
incorporating in each case a free-flowing material into the at least two cavities formed, such that the cover layer is in each case formed by the material on the at least two regions.

This refinement of the invention offers the advantage that in each case a free-flowing material, such as for example plastics, which forms the cover layer on the respective region can be applied to arbitrary at least two regions of the front side of the decorative element, wherein the at least two cover layers, preferably when viewed in the plan view of the visible side of the component, are disposed so as to be completely spaced apart from one another, or completely separated from one another, respectively. By virtue of the complete spacing, or of the completely separate disposal, respectively, of the least two cover layers, at least a part-region of the two-dimensionally extending decorative element is visible, preferably when viewed in the plan view of the visible side of the component, said part-region thus being able to be effective in a decorative manner. The method according to the invention thus permits that the front side of the two-dimensionally extending decorative element, or the visible side of the component, respectively, can be designed in an arbitrary decorative manner. For example, all cover layers or a proportion of the at least two cover layers can be at least produced from different materials, at least have different surface structuring, or at least have different colors, for example. In the context of the invention, materials are mutually different if said materials are of a different composition. In the case of materials being mutually identical, said materials are of an identical composition.

According to a refinement of the invention, the material which in each case is incorporated into the at least two cavities, such that the cover layer is in each case formed by the material on the at least two regions, is a plastics, preferably a lacquer.

According to a refinement of the invention, the disposal of in each case a cover layer on at least two regions of the front side of the provided two-dimensionally extending decorative element is carried out as follows, or comprises the following steps, respectively:
disposing a prefabricated cover layer on at least one region of the at least two regions of the provided two-dimensionally extending decorative element;

disposing at least one cover element on at least one region of the at least two regions of the provided two-dimensionally extending decorative element, such that the at least one cover element in each case conjointly with the at least one region forms a cavity;

incorporating a free-flowing material into the at least one cavity formed, such that the cover layer is in each case formed by the material on the at least one region.

The method according to this refinement of the invention permits the production of a component having a two-dimensionally extending decorative element, at least one prefabricated cover layer such as, for example, a sheet metal panel or a foil, on the one hand, and at least one cover layer that has been formed on the front side of the two-dimensionally extending decorative element by a free-flowing material while the method according to the invention has been carried out on the other hand, being disposed on the front side of said two-dimensionally extending decorative element. This refinement of the invention thus enables an enhanced variability in terms of the design of the component. A prefabricated cover layer is a cover layer which, for example, has been pre-cut, pre-formed, etc.

According to a refinement of the invention, the prefabricated cover layer is produced from plastics, preferably produced from metal.

According to a refinement of the invention, the material that is incorporated into the at least one cavity formed, such that the cover layer is in each case formed by the material on the at least one region, is a plastics, preferably a lacquer.

According to a refinement of the invention, the cover element is additionally disposed on at least a part-region of the front side of the two-dimensionally extending decorative element, wherein a respective part-region includes at least that region on which a respective prefabricated cover layer is disposed such that at least the prefabricated cover layer conjointly with the cover element forms a cavity, and wherein a free-flowing material is incorporated into the cavity formed such that a protective layer is formed at least on the prefabricated cover layer, in particular at least on a front side of the prefabricated cover layer.

The protective layer is preferably formed from a translucent material, such that the prefabricated cover layer, in particular the front side thereof, that is disposed below the protective layer is visible. Preferably, the prefabricated cover layer and a region of the front side of the two-dimensionally extending decorative element that is directly adjacent to the prefabricated cover layer and at least partially encloses the prefabricated cover layer conjointly with the cover element form the cavity into which the free-flowing material is incorporated. In the case of this preferred embodiment, additionally to the front side of the prefabricated cover layer, a lateral region of the prefabricated cover layer is also protected by the protective layer. The prefabricated cover layer in the case of this refinement of the invention is preferably a functional foil which, for example, has electronics which are preferably printed onto the foil.

According to a refinement of the invention, the cover element is a component part of an injection-molding tool, wherein the injection-molding tool has a first mold part and a second mold part, wherein the first mold part forms the cover element. The provided two-dimensionally extending decorative element is preferably disposed in the second mold part. This refinement of the invention offers the advantage that the component can be produced in large series and thus in a simple and cost-effective manner.

BRIEF DESCRIPTION OF THE DRAWINGS

Preferred embodiments of the invention will be described hereunder by means of the drawings which serve merely as an explanation and are not to be considered limiting. In the drawings:

FIGS. 5-12 schematically show method steps for the production of a second embodiment of a component according to the invention;

FIGS. 13-20 schematically show method steps for the production of a third embodiment of a component according to the invention;

DESCRIPTION OF PREFERRED EMBODIMENTS

In the case of the embodiments shown hereunder in FIG. 1 to 26, same or similar features, or features of similar function, are in each case provided with the same reference signs.

Figure 1:
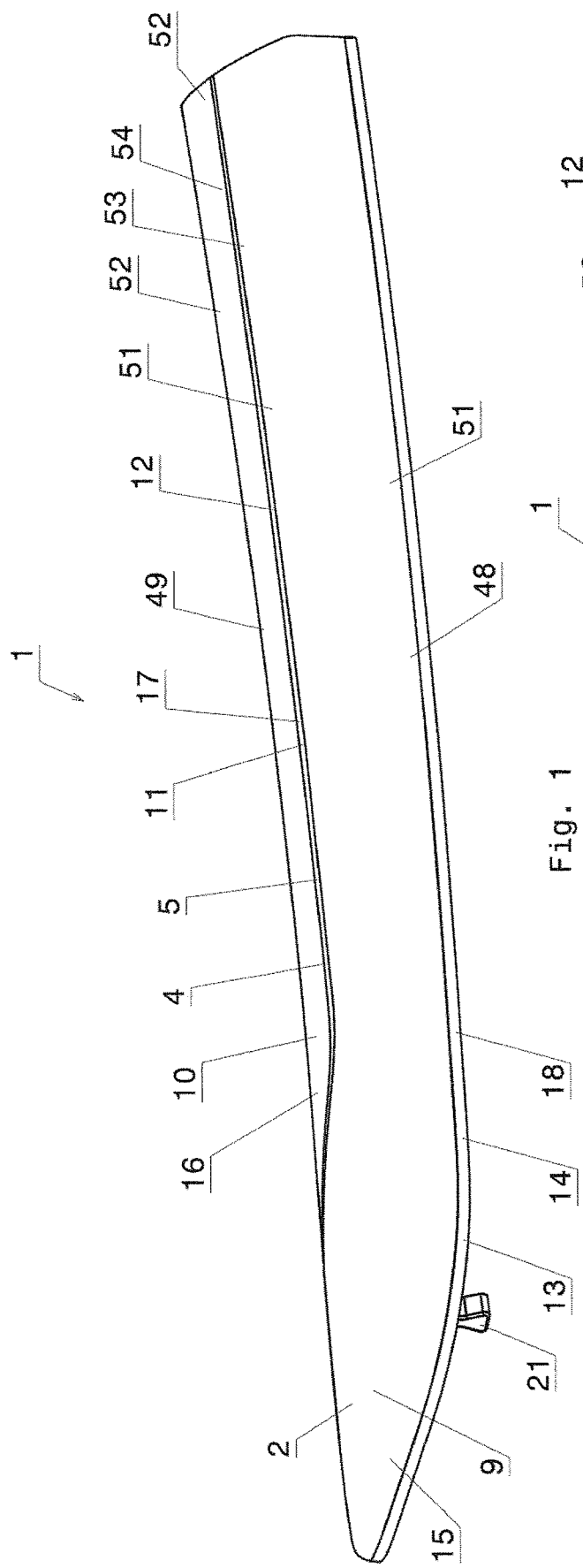
FIG. 1 schematically shows a spatial view of a first embodiment of a component according to the invention.
Figure 2:
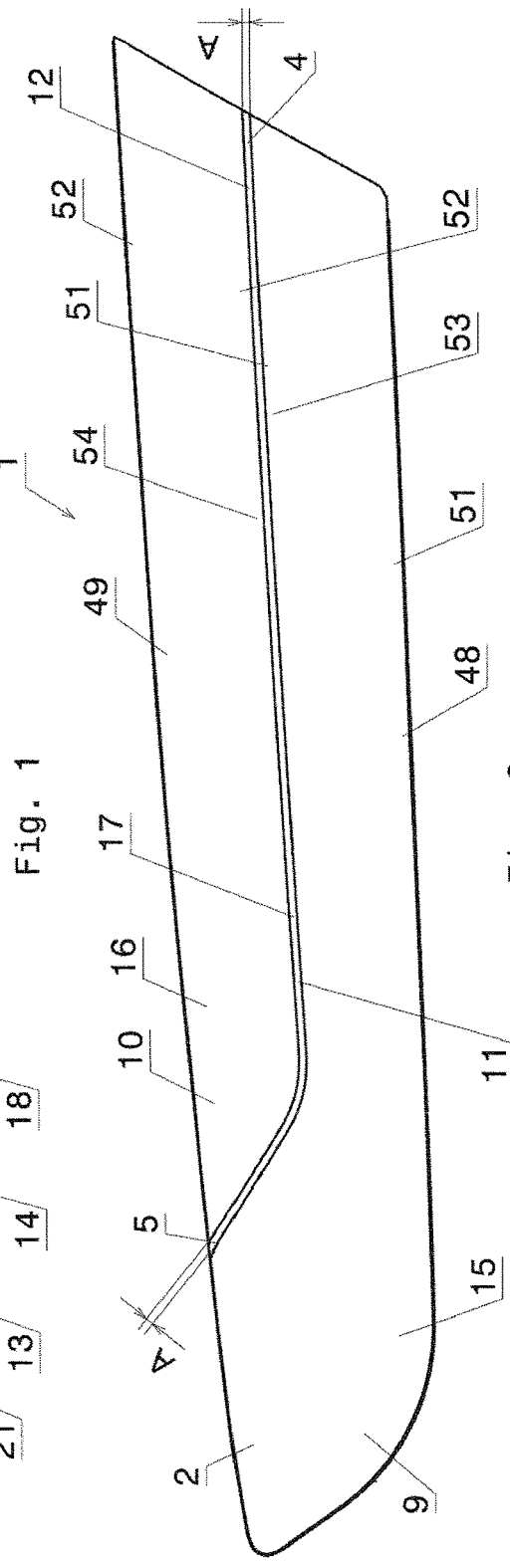
FIG. 2 schematically shows a plan view of the component according to FIG. 1.
Figure 3:
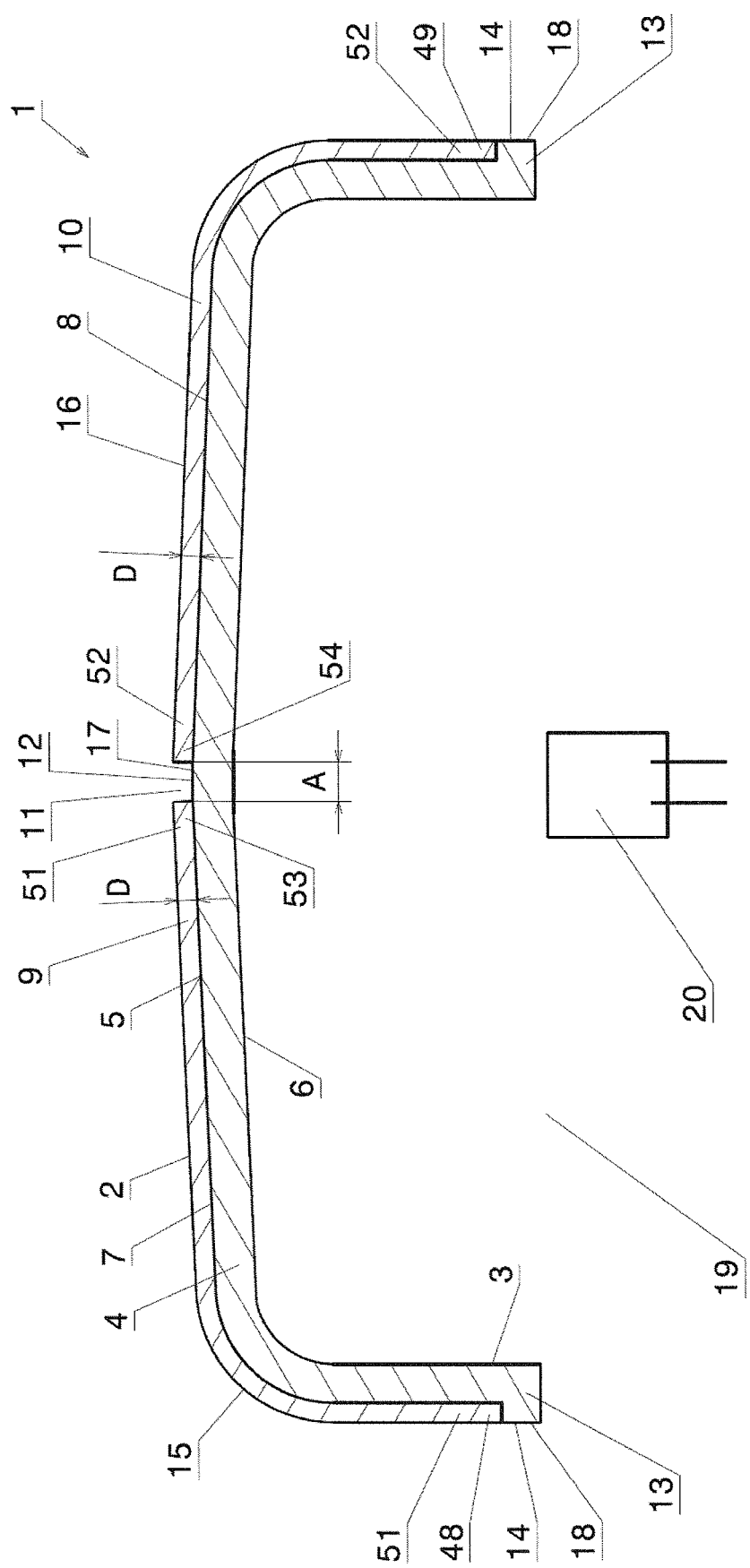
FIG. 3 schematically shows a greatly enlarged cross-section through the component according to FIG. 1.
Figure 4:
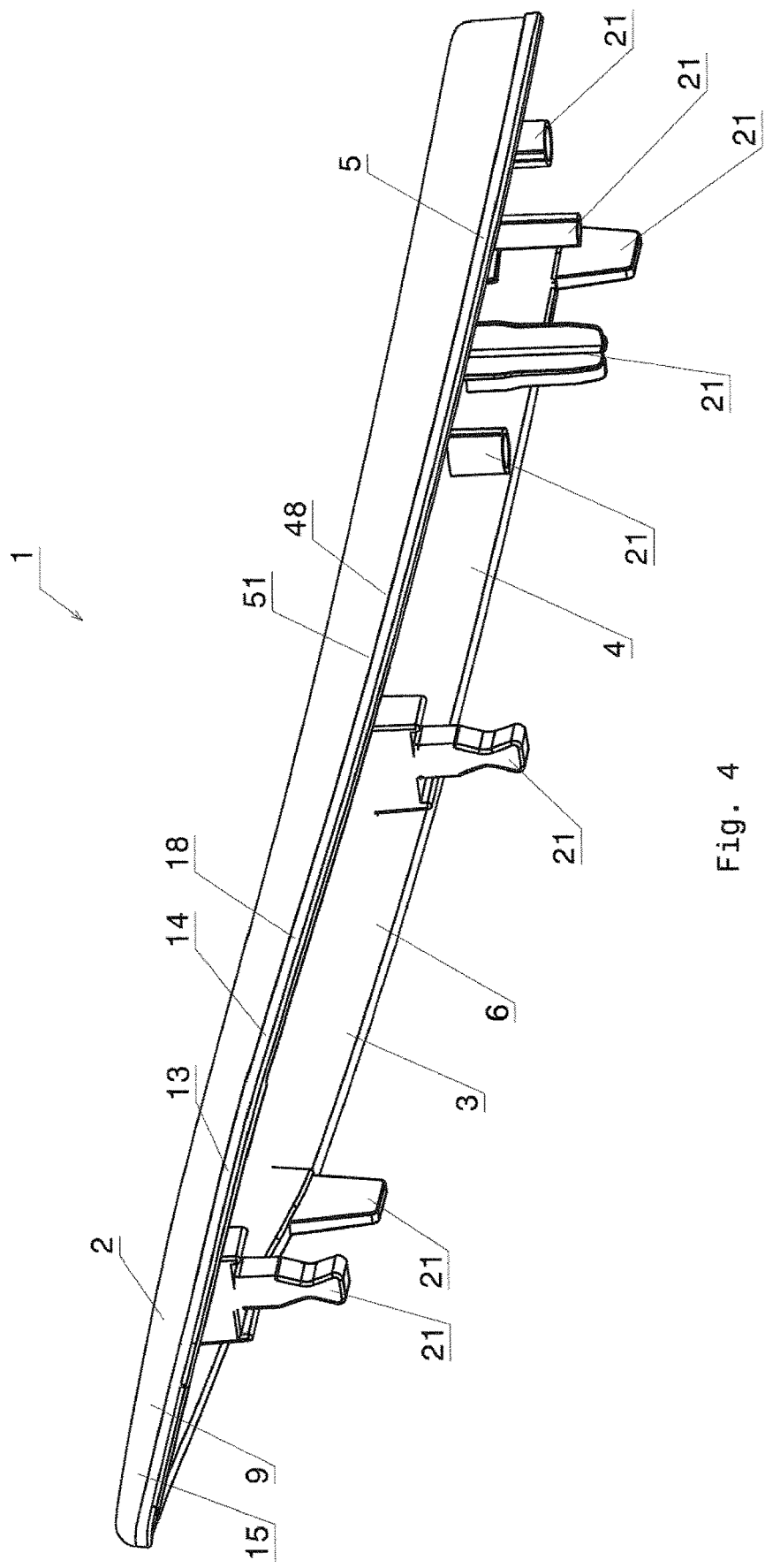
FIG. 4 schematically shows a view of a rearward side of the component according to FIG. 1.

FIG. 1 schematically shows a spatial view of a first embodiment of a component according to the invention. FIG. 2 schematically shows a plan view of the component according to FIG. 1. A greatly enlarged cross-section through the component according to FIG. 1 is schematically shown in FIG. 3. FIG. 4 schematically shows a view of a rearward side of the component according to FIG. 1.

The component 1 according to the invention has a visible side 2 and a rearward side 3 according to FIGS. 1 to 4. The component 1 comprises a two-dimensionally extending decorative element 4 that is configured in the shape of a tape, having a front side 5 and a rear side 6. As can be seen in FIG. 3, the two-dimensionally extending decorative element 4 is preferably produced so as to be integral. This offers the advantage that the component 1 can be produced in a particularly simple manner and has a visually appealing design. In each case a cover layer is disposed on two regions of the front side 5, that is to say on a first region 7 and on a second region 8. In the case of the component 1, a first cover layer 9 is disposed on the first region 7, and a second cover layer 10 is disposed on the second region 8. It can be seen in FIGS. 1, 2, 3 that the first cover layer 9 and the second cover layer 10 on the visible side 2 of the component 1, or in the plan view of the visible side 2 of the component 1, respectively, are completely spaced apart from one another. Since the first cover layer 9 and the second cover layer 10 are completely spaced apart from one another, a continuous gap 11 is present between the first cover layer 9 and the second cover layer 10, as can be seen in FIGS. 1, 2, 3, such that, in particular in the plan view of the component 1 according to FIG. 2, a region 12 of the front side 5 of the two-dimensionally extending decorative element 4 that is disposed so as to be continuous between the first cover layer 9 and the second cover layer 10 is visible.

As can be seen in FIGS. 1, 3, 4, the two-dimensionally extending decorative element 4 has a periphery 13 which forms a region 14 of the front side 5 of the two-dimensionally extending decorative element 4. As can be seen in FIGS. 1, 3, 4, the periphery 13 preferably terminates so as to be flush with an outer region 48 of a periphery 51 of the first cover layer 9 and with an outer region 49 of a periphery 52 of the second cover layer 10. The component 1 by virtue of the flush termination is better protected against damage.

In the case of the component 1 according to the invention the first cover layer 9 forms a first surface 15 of the visible side 2 of the component 1, and the second cover layer 10 forms a second surface 16 of the visible side 2 of the component 1. A third surface 17 of the visible side 2 of the component 1 is formed by the region 12 of the front side 5 of the two-dimensionally extending decorative element 4, and a fourth surface 18 of the visible side 2 of the component 1 is formed by the region 14 of the front side 5 of the two-dimensionally extending decorative element 4. The visible side 2 of the component 1 is thus formed conjointly by the first cover layer 9, the second cover layer 10 and the regions 12, 14 of the two-dimensionally extending decorative element 4, or conjointly by the first surface 15, the second surface 16, the third surface 17 and the fourth surface 18, respectively. The first surface 15 and the second surface 16 can in each case be designed in an individual manner. Since the surfaces 17 and 18 are formed by the two-dimensionally extending decorative element 4, the surfaces 17 and 18 conjointly form a surface that is capable of being designed in an individual manner. In the case of the component 1 according to the invention, the visible side 2 of the component 1 is thus formed by three surfaces that are capable of being designed in an individual manner, and in the case of the component 1, the number of the surfaces that are capable of being designed in individual manner and that form the visible side 2 of the component 1 is thus larger than in the case of trim parts of the prior art.

The first cover layer 9 and the second cover layer 10 preferably conjointly cover at least 50% of the area of the front side 5 of the two-dimensionally extending decorative element 4, more preferably at least 75% of the area of the front side 5 of the two-dimensionally extending decorative element 4, even more preferably at least 95% of the area of the front side 5 of the two-dimensionally extending decorative element 4. These preferred embodiments offer the advantage that the component 1 achieves a particularly esthetic effect in the case of the percentage-wise coverages mentioned of the front side 5 of the two-dimensionally extending decorative element 4 by the first cover layer 9 and the second cover layer 10. In the case of the component 1 that is illustrated in FIGS. 1 to 4, the first cover layer 9 and the second cover layer 10 conjointly cover at least 95% of the area of the front side 5 of the two-dimensionally extending decorative element 4.

The first cover layer 9 and/or the second cover layer 10 can be produced from an opaque material, for example. The opaque material is, for example, metal or plastics, preferably plastics. The plastics can be, for example, a lacquer, such as a scratch-resistant lacquer or a soft lacquer. The production of a cover layer from plastics enhances the freedom of design since the plastics can be provided with dyes. The opaque configuration of the first cover layer 9 and of the second cover layer 10 offers the advantage that the regions 7, 8 of the two-dimensionally extending decorative element 4 that are disposed below the cover layers 9, 10 are covered and thus not visible, and that the two-dimensionally extending decorative element 4 can thus be produced from a comparatively lower grade and thus more cost-effective material. However, the first cover layer 9 and/or the second cover layer 10 can also be formed by a translucent material, for example.

It can be seen in the plan view of the component 1 (cf. FIG. 2) that the region 12 of the front side 5 of the two-dimensionally extending decorative element 4 partially borders the first cover layer 9 as well as the second cover layer 10. It can be seen by means of FIGS. 1, 2, 3 that an inner region 53 of the periphery 51 of the first cover layer 9, and an inner region 54 of the periphery 52 of the second cover layer 10 are configured so as to be raised in relation to the region 12. The cover layers 9, 10 are thus configured so as to be partially raised in relation to the region 12 of the front side 5 of the two-dimensionally extending decorative element 4. Additional design effects can be achieved on account of the raised feature.

The thickness D of the first cover layer 9 and of the second cover layer 10 is preferably in the range from 100 micrometers to 1000 micrometers, more preferably in the range from 200 micrometers to 800 micrometers, even more preferably in the range from 400 to 600 micrometers, most preferably in the range from 450 micrometers to 550 micrometers.

Most preferably, the first cover layer 9 and the second cover layer 10 in each case have a thickness D in the range from 450 micrometers to 550 micrometers. The first cover layer 9 and the second cover layer 10 in this range have a good scratch resistance and are furthermore readily producible, in particular by means of an injection-molding tool. The ready producibility is provided for the following reason: in the case of the first cover layer 9 and of the second cover layer 10 in each case being formed in a cavity, in particular of an injection-molding tool, a respective cavity has a height of approximately 450 micrometers to 550 micrometers, or a respective cavity has a height which corresponds approximately to the thickness D of the respective cover layer to be formed. In the case of the height mentioned of the cavities of 450 micrometers to 550 micrometers, the material for forming the cover layer 9 or the cover layer 10, respectively, that is incorporated into the respective cavity can still readily flow, and the cavities can therefore be readily and completely filled with the material.

The two-dimensionally extending decorative element 4 is preferably configured so as to be translucent or opaque. The two-dimensionally extending decorative element 4 is more preferably configured so as to be translucent.

In the case of the two-dimensionally extending decorative element 4 being configured so as to be translucent, the translucent two-dimensionally extending decorative element 4 is preferably produced from metal such as, for example, aluminum, steel, or stainless steel, or from plastics, more preferably from plastics. However, the two-dimensionally extending decorative element 4 can also be produced from wood, for example. In the case of metal or plastics, the two-dimensionally extending decorative element 4 is, for example, a foil that is flexible or is a self-supporting element, preferably is flexible. In the case of the two-dimensionally extending decorative element being a foil, the foil has a thickness in the range from 0.05 millimeter to 1 millimeter, for example, preferably in the range from 0.1 millimeter to 0.3 millimeter. The foil can be configured as a functional foil, for example, wherein the functional foil has electronics, for example, which are preferably printed onto the foil. The two-dimensionally extending decorative element 4 has a thickness of one millimeter or less, for example.

The two-dimensionally extending decorative element 4 of the component 1 in the present case is preferably produced from a translucent plastics. The production of the two-dimensionally extending decorative element 4 from plastics enhances the freedom of design since the plastics can be provided with dyes. The translucent configuration of the two-dimensionally extending decorative element 4 moreover offers the advantage that, as can be seen in FIG. 3, light that is emitted from an illumination means 20 that is disposed in the rearward region 19 of the two-dimensionally extending decorative element 4 can pass through the two-dimensionally extending decorative element 4 that is configured so as to be translucent and can be perceived on the visible side of the component 1. The illumination means 20 can be, for example, a light-emitting diode, or a plurality of light-emitting diodes, as is illustrated in FIG. 3. An illuminated foil, in particular an electroluminescent foil or an OLED, or a lightbulb, are also possible, for example. In the case of the present component 1, the first cover layer 9 and the second cover layer 10 are preferably produced from an opaque material. This preferred embodiment offers the advantage that in the case of the configuration of the two-dimensionally extending decorative element 4 from a translucent plastics, the first cover layer 9 and the second cover layer 10 are completely surrounded by light that is emitted from the illumination means 20 and which exits the component 1 by way of the regions 12 and 14 on the visible side, which is particularly esthetic. On account of being completely surrounded by light (cf. FIGS. 1, 2, 3 and 4 conjointly), the cover layers 9 and 10, in particular in the plan view of the visible side 2 of the component 1, moreover appear as if said cover layers 9 and 10 were floating. For the sake of simplicity, the illumination means 20 that is illustrated in FIG. 3 is not illustrated in FIGS. 1, 2, 4. In the installed state of the component 1 (not illustrated), in particular in the installed state of the component 1 in a motor vehicle (not illustrated), the cover layers 9, 10 are preferably capable of being surrounded partially, more preferably completely, by light that is emitted from the illumination means 20.

The first cover layer 9 and the second cover layer 10 are preferably spaced apart from one another by at least 0.3 millimeter, more preferably at least 1 millimeter, even more preferably at least 2 millimeters, or have a mutual spacing A of preferably at least 0.3 millimeter, more preferably at least 1 millimeter, even more preferably at least 2 millimeters, respectively. The maximum spacing is preferably 10 millimeters. In the case of these dimensions, the region 12 of the front side 5 of the decorative element 4 is particularly well visible and can thus become esthetically effective in a particularly positive manner. Moreover, light by way of the visible side 2 of the component 1 can exit from the component 1 in a particularly positive manner by way of a region 12 that is dimensioned in such a manner. As can be seen in FIG. 2, the spacing A is constant across the length of the gap 11. Of course, the spacing A can also be variable across the length of the gap 11.

In the case of the two-dimensionally extending decorative element 4 being configured so as to be opaque, the opaque two-dimensionally extending decorative element 4 is preferably produced from metal or plastics, preferably from plastics. The opaque configuration of the two-dimensionally extending decorative element 4 offers the advantage that a component part of the component 1 that is disposed in the region 19 of the rear side 6 of the two-dimensionally extending decorative element 4, in particular in the plan view of the visible side 2 of the component 1, is not visible and thus does not disturb the esthetics of the visible side 2 of the component 1.

In order for the component 1 to be fastened to a vehicle, for example, in particular to a body of the vehicle, the component 1, preferably on the rear side 6 of the two-dimensionally extending decorative element 4, has fastening means 21 which are preferably integrally molded to the two-dimensionally extending decorative element 4. This can be seen in FIGS. 1, 4. If the fastening means 21 are integrally molded to the two-dimensionally extending decorative element 4, the two-dimensionally extending decorative element 4 and the fastening means 21 are produced from the same material.

Such a component 1 that is fastenable to the motor vehicle is producible in a particularly simple manner, in particular in the case of the two-dimensionally extending decorative element 4 and the fastening means 21 being produced from plastics. For the sake of simplicity, the fastening means 21 that are illustrated in FIGS. 1, 4 are not illustrated in FIG. 3.

As can be seen in FIGS. 1 to 4, the component 1 is configured as a trim strip. Of course, the component 1 can also be configured, for example, as an operating element, such as, for example, a pushbutton, or as a foot strip or door-sill strip of a vehicle, for example. The above-mentioned vehicle is preferably a motor vehicle and particularly preferably a road-bound motor vehicle. The component 1 can be provided in the internal region and/or in the external region of the vehicle. However, the component 1 can also be configured, for example, as a trim strip or as an operating element of a domestic appliance such as, for example, of a refrigerator, of a steam cooker, of a washing machine, of an oven, of a hob, of the dishwasher, or of an item of furniture.

Method steps for the production of a second embodiment of a component 1 according to the invention will be described hereunder by means of the schematic FIGS. 5 to 12.

The production of the second embodiment of a component 1 according to the invention will be described in an exemplary manner while using an injection-molding method. The injection-molding tool 23 that is schematically illustrated in the section in FIGS. 5 and 6 comprises a first mold part 24 and a second mold part 25, wherein a cavity 26 is formed between the two mold parts 24 and 25 which bear on one another on a separation face 30. A free-flowing material, in particular plastics, is now incorporated into the cavity 26 by way of a nozzle 27 that is disposed in the second mold part 25, and a two-dimensionally extending decorative element 4 having a front side 5 and a rear side 6 is formed or provided, respectively, in the cavity 26 on account thereof, said two-dimensionally extending decorative element 4 being illustrated in FIG. 6. During the production or the formation, respectively, of the two-dimensionally extending decorative element 4, the rear side 6 of the two-dimensionally extending decorative element 4 is preferably impinged with gas (not illustrated) that is incorporated into the cavity 26 by way of a nozzle 28 that is disposed in the first mold part 24. The formation of sink marks on the front side 5 of the two-dimensionally extending decorative element 4 can be prevented by impinging the rear side 6 of the two-dimensionally extending decorative element 4 with gas, and a two-dimensionally extending decorative element 4 having an esthetic front side 5 can thus be provided.

Once the free-flowing material has preferably been cured, the second mold part 25 in a subsequent method step, as is illustrated in FIG. 7, is replaced by a cover element that is illustrated in the section and is configured as a third mold part 29, wherein the two-dimensionally extending decorative element 4 formed furthermore remains disposed in the first mold part 24. As can be seen in FIG. 7, the third mold part 29 has a first depression 31 and a second depression 32, wherein both depressions 31, 32 are configured so as to be open in relation to an external side 33 of the third mold part 29. The surface 34 that delimits the second depression 32 is partially structured, as can be seen in FIG. 7.

By replacing the second mold part 25 by the third mold part 29, an injection-molding tool 23' in which the third mold part 29 is disposed on or above, respectively, a first region 7 and a second region 8 of the front side 5 of the two-dimensionally extending decorative element 4 is formed, such that the third mold part 29 in each case conjointly with each of the two regions 7, 8 forms a cavity, as can be seen in FIG. 8. The third mold part 29, or the first depression 31 thereof, respectively, conjointly with the first region 7 forms a first cavity 37, and the second region 8 conjointly with the third mold part 29, or the second depression 32 thereof, respectively, forms a second cavity 38. A free-flowing material such as, for example, a plastics, that is, for example, a lacquer, is now incorporated into the first cavity 37 by way of the nozzle 39 that is disposed in the third mold part 29, and a first cover layer 9 is produced on the first region 7 of the front side 5 of the two-dimensionally extending decorative element 4 on account thereof (cf. FIG. 9). A free-flowing material such as, for example, a plastics, that is, for example, a lacquer, is likewise incorporated into the second cavity 38 by way of the nozzle 40 that is disposed in the mold part 29, and a second cover layer 10 is produced on the second region 8 of the front side 5 of the two-dimensionally extending decorative element 4 on account thereof (cf. FIG. 9). The production of the first cover layer 9 and the production of the second cover layer 10 can be performed simultaneously or in a temporally-offset manner. The material by means of which the first cover layer 9 is produced can be identical or different to the material from which the second cover layer 10 is produced. In the context of this invention, two materials are identical if the composition thereof is identical. In the context of this invention, two materials are different if the composition thereof is different.

The cavities 37 and 38 are completely separated from one another by a part-region 35 of the mold part 29 which bears on the front side 5 of the two-dimensionally extending decorative element 4 and seals in relation to the front side 5 of the two-dimensionally extending decorative element 4. No material can thus flow from the first cavity 37 along the front side 5 of the two-dimensionally extending decorative element 4 into the second cavity 38 and vice versa. The part-region 35 moreover has the effect that the first cover layer 9 is completely separated from the second cover layer 10 by a gap 11 in the case of the component 1 to be produced (cf. FIGS. 10, 11, 12).

On account of the partial structuring of the surface 34 of the mold part 29 that delimits the second depression 32, a part-region 45 of a second surface 16 of the second cover layer 10 has a surface structuring that corresponds to said structuring, said surface structuring potentially being a grain, for example. As can be seen in FIGS. 7 and 8, a surface 43 that delimits the first depression 31 is not structured. Accordingly, a first surface 15 of the first cover layer 9 in a manner comparable to the structured part-region 45 of the second surface 16 of the second cover layer 10 is configured so as to be smooth (cf. FIGS. 9 to 12).

Figure 21:
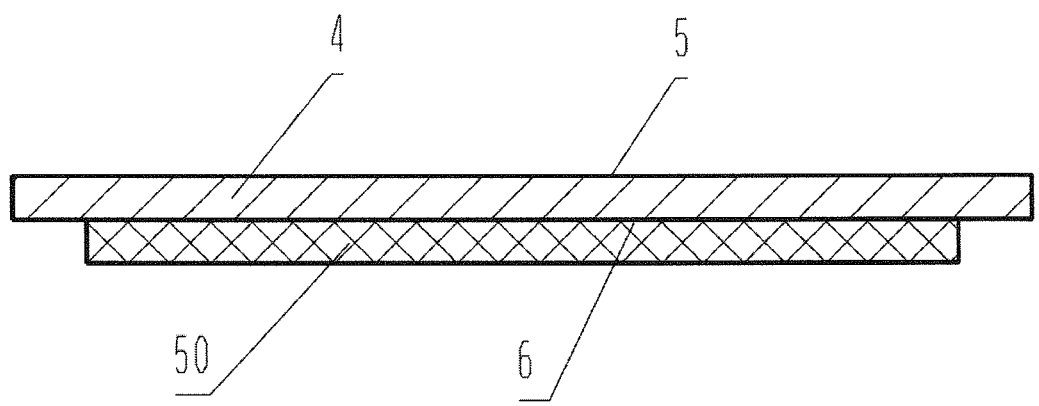
FIG. 21 schematically shows a two-dimensionally extending decorative element having a layer for the production of the component according to FIG. 12.

As an alternative to the production of the two-dimensionally extending decorative element 4, as has been described in the context of FIGS. 5 and 6, a prefabricated two-dimensionally extending decorative element 4 can also be placed into the cavity 26 of the injection-molding tool 23' according to FIG. 8, and subsequently the first cover layer 9 and the second cover layer 10 can be produced on the prefabricated two-dimensionally extending decorative element 4. In this case, a simplified form of the injection-molding tool 23' can be used, the first mold part 24 of the latter no longer having any nozzle 28 for injecting gas into the cavity 26. Such a decorative element 4, a layer 50 that is configured in particular as a support layer optionally being disposed and fastened on the rear side 6 of said decorative element 4, is illustrated in FIG. 21.

Once the first cover layer 9 and the second cover layer 10 have been formed, the mold part 29 is lifted from the mold part 24 (cf. FIG. 10) and a preliminary stage 46 of the component 1 according to the invention to be produced is removed from the injection-molding tool 23'.

Once the preliminary stage 46 has been removed, part-regions 47 of a circumferential periphery 44 of the preliminary stage 46 are severed. Part-regions 47 on which in each case a sprue that is created in the generation of the first surface 15 of the first cover layer 9, or is created in the generation of the second surface 16 of the second cover layer 10, respectively, is visible are severed. The sprues mentioned would compromise the esthetic quality of a visible side 2 of the component 1. The severing edges are schematically indicated by dashed lines in FIG. 11. Severing of the part-regions 47 is performed, for example, by means of cutting, milling, or sawing. Thereafter, as is illustrated in FIG. 11, an illumination means 20 is preferably disposed in the region 19 of the rear side 6 of the two-dimensionally extending decorative element 4, and the second embodiment of the component 1 according to the invention is thus achieved, as can be seen in FIG. 12.

As can be seen in FIG. 12, the first cover layer 9 and the second cover layer 10 in the case of the component 1 are completely spaced apart from one another by a gap 11 such that, in particular in the plan view of the visible side 2 of the component 1 according to FIG. 12 (not illustrated), a region 12 of the front side 5 of the two-dimensionally extending decorative element 4 that is disposed so as to be continuous between the first cover layer 9 and the second cover layer 10 is visible. It can moreover be seen in FIG. 12 that the surfaces 15, 16, a third surface 17 that is formed by the region 12 of the front side 5 of the two-dimensionally extending decorative element 4, and a circumferential fourth surface 18 that is formed by a region 14 of the front side 5 of the two-dimensionally extending decorative element 4 conjointly form the visible side 2 of the component 1 according to FIG. 12.

Since the second embodiment of the component 1 according to the invention has an illumination means 20, the two-dimensionally extending decorative element 4 is preferably produced from a translucent material, and the first cover layer 9 and the second cover layer 10 are preferably produced from an opaque material. Of course, the first cover layer 9 and/or the second cover layer 10 can also be produced from a translucent material. Light that is emitted from the illumination means 20 can now pass through the translucent two-dimensionally extending decorative element 4 and can then be emitted from the component 1 by way of the third surface 17 that is disposed between the first cover layer 9 and the second cover layer 10, and by the circumferential fourth surface 18. The light that is emitted from the illumination means 20 and from the visible side 2 is schematically illustrated in FIG. 12 by means of arrows. Since the first cover layer 9 and the second cover layer 10 of the component 1 according to FIG. 12 are produced from an opaque material, the cover layers 9, 10 are surrounded by the light that is emitted from the visible side 2, which is particularly esthetic. In the installed state, for example if the component 1 is installed in a motor vehicle, it is of course possible for the circumferential fourth surface 18 to be covered such that only the light that exits by way of the third surface 17 is visible on the visible side 2 of the installed component 1.

Method steps for the production of a third embodiment of a component 1 according to the invention will be described hereunder by means of the schematic FIGS. 13 to 20. FIGS. 13 to 20 correspond substantially to FIGS. 5 to 12. In order for repetitions to be avoided, the differences between the production of the second embodiment of the component 1 according to the invention and the production of the third embodiment of the component 1 according to the invention will be primarily described hereunder.

As is illustrated in FIGS. 13 and 14, a two-dimensionally extending decorative element 4 is produced in an identical manner as has been described in the context of FIGS. 5, 6.

Thereafter, as has already been described in the context of FIG. 7, the mold part 25 is replaced by a cover element that is configured as the mold part 29 (cf. FIG. 15). Before the mold part 29 is disposed on the mold part 24, a prefabricated first cover layer 9 is disposed on a first region 7 of the front side 5 of the two-dimensionally extending decorative element 4.

Having disposed the prefabricated first cover layer 9, the mold part 29, as can be seen in FIG. 16, is disposed on a part-region 42 of the front side 5 of the two-dimensionally extending decorative element 4, said part-region 42 including the first region 7 on which the prefabricated first cover layer 9 is disposed. The prefabricated first cover layer 9 conjointly with the mold part 29 and the part-region 42 thus forms a first cavity 37. The prefabricated first cover layer 9 is produced from plastics or metal, for example. The mold part 29 that is disposed according to FIG. 16 is moreover disposed on a second region 8 of the front side 5 of the two-dimensionally extending decorative element 4, wherein the mold part 29 conjointly with the second region 8 forms a second cavity 38.

A free-flowing material such as, for example, a plastics is incorporated in each case into the first cavity 37 and into the second cavity 38. The supply of the material into the cavity 37 is performed by way of a nozzle 39, and the supply of material into the second cavity 38 is established by way of a nozzle 40. The material that is incorporated into the first cavity 37, said material preferably being translucent, partially covers the prefabricated first cover layer 9 and on the prefabricated first cover layer 9 forms a protective layer 36 as can be seen in FIG. 17. A second cover layer 10 is formed by the incorporation of material into the cavity 38.

After the formation of the protective layer 36 and of the second cover layer 10, the mold part 29 is lifted from the mold part 24 and a preliminary stage 46 of the component 1 according to the invention to be produced is removed from the injection-molding tool 23' (cf. FIGS. 18, 19).

Having removed the preliminary stage 46, part-regions 47 of a circumferential periphery 44 of the preliminary stage 46 are severed. Part-regions 47 on which in each case a sprue that is created in the generation of the surface 41 of the protective layer 36, or is created in the generation of the second surface 16 of the second cover layer 10, respectively, is visible are severed. The severing edges are schematically indicated by dashed lines in FIG. 19. Severing of the part-regions 47 is performed, for example, by means of cutting, milling, or sawing.

The third embodiment of the component 1 according to the invention, that is illustrated in FIG. 20, is preferably configured without illumination means 20. The two-dimensionally extending decorative element 4 and the first prefabricated cover layer 9 and the second cover layer 10 are therefore preferably formed from a plastics that is preferably opaque. The first prefabricated cover layer 9 and the second cover layer 10 are preferably produced from a plastics of which the color contrasts with the color of the plastics from which the two-dimensionally extending decorative element 4 is produced. Such a component 1 has a particularly esthetic appearance.

As can be seen in FIG. 20, the first prefabricated cover layer 9 and the second cover layer 10 in the case of the third embodiment of the component 1 according to the invention are completely spaced apart from one another by way of a gap 11 such that, in particular in the plan view of the visible side 2 of the component 1 according to FIG. 20, a region 12 of the front side 5 of the two-dimensionally extending decorative element 4 that is disposed so as to be continuous between the first cover layer 9 and the second cover layer 10 is visible (not illustrated). It can moreover be seen in FIG. 20 that a first surface 15 that is formed by the prefabricated cover layer 9, the second surface 16, a third surface 17 that is formed by the region 12 of the front side 5 of the two-dimensionally extending decorative element 4, and a circumferential fourth surface 18 that is formed by a region 14 of the front side 5 of the two-dimensionally extending decorative element 4 conjointly form the visible side 2 of the component 1 according to FIG. 20. It can furthermore be seen in FIG. 20 that the component 1 has a protective layer 36 that is preferably produced from a translucent material and which covers a part-region of the visible side 2 of the component 1.

A fourth embodiment of a component according to the invention is schematically shown in FIGS. 22 to 25. This fourth embodiment differs from that of FIGS. 1 to 4 in that the first cover layer 9 and the second cover layer 10 in each case terminate so as not to be spaced apart from the end face of the two-dimensionally extending decorative element 4 that is formed by the periphery 13, but extend up to said end face and even cover the end face that is formed by the periphery 13. The end face that is formed by the periphery 13 connects the front side 5 to the rear side 6 of the two-dimensionally extending decorative element 4. On account thereof, the front side 5 of the two-dimensionally extending decorative element 4 in the perspective views of FIGS. 22 and 25 from obliquely above or from obliquely below, respectively, is only still visible in the region of the gap 11, this being potentially desirable for esthetic reasons in certain cases. Moreover, the two-dimensionally extending decorative element 4 is better protected from environmental influences on account thereof.

Figure 24:
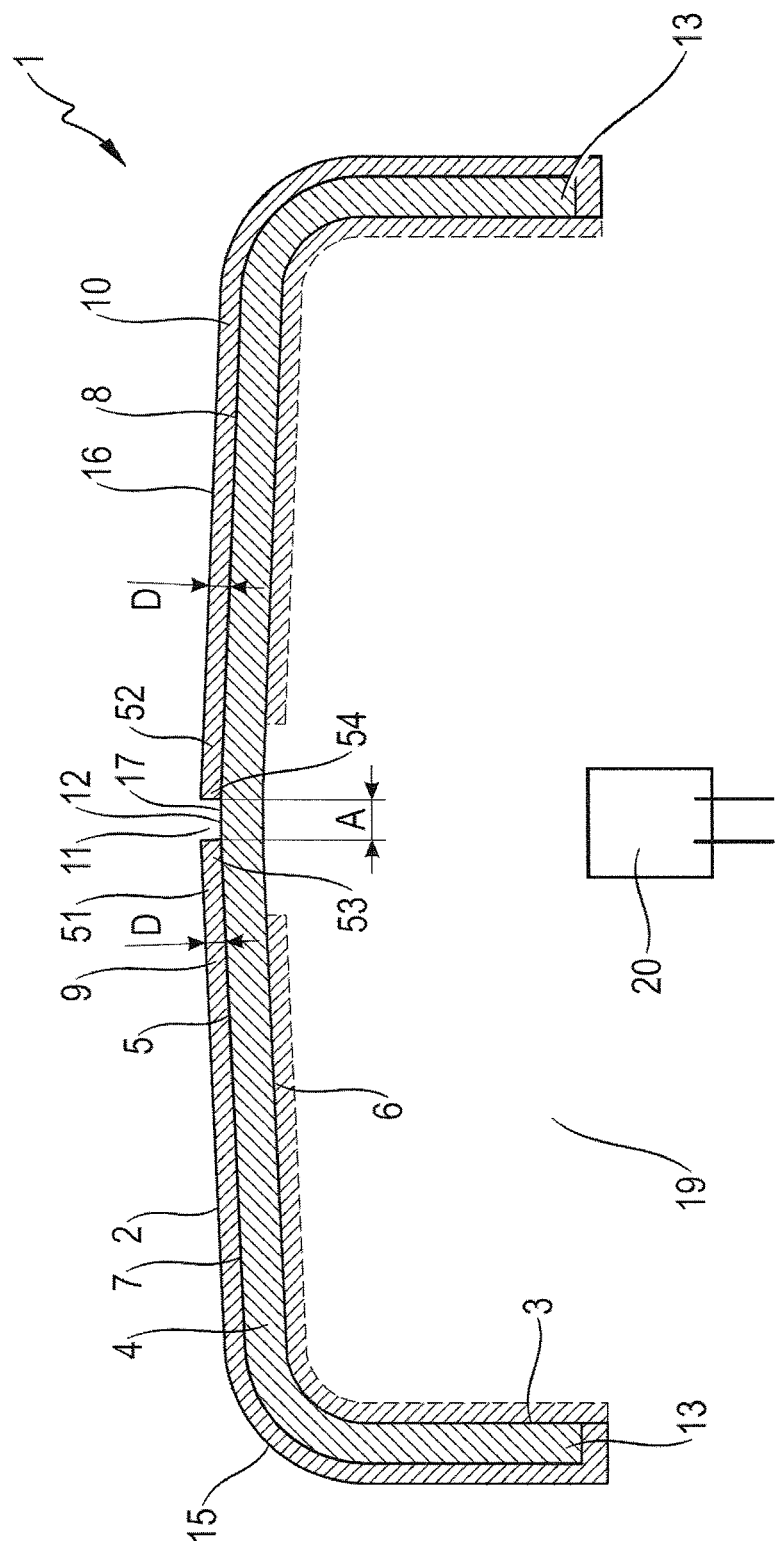
FIG. 24 schematically shows a greatly enlarged cross-section through the component according to FIG. 22.
Figure 25:
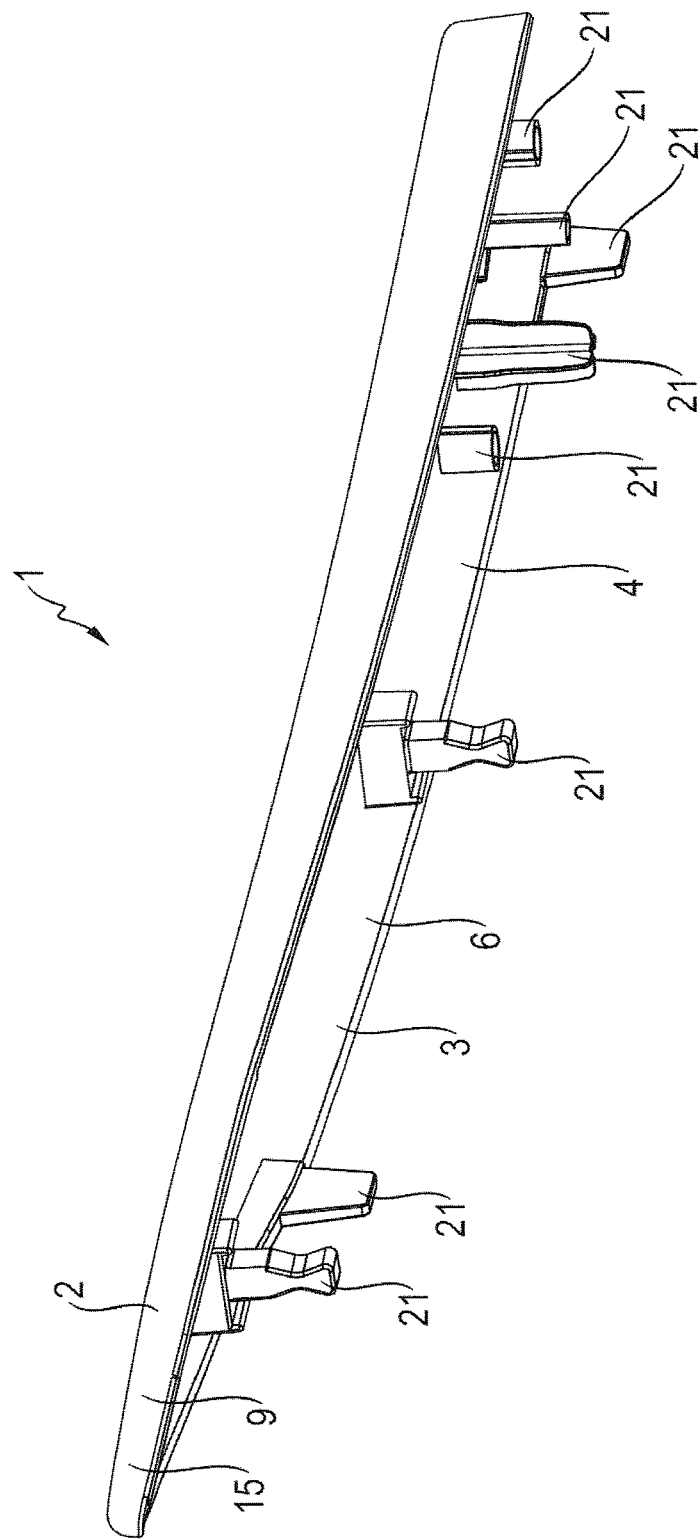
FIG. 25 schematically shows a view of a rearward side of the component according to FIG. 22.

In a variant of the fourth embodiment, which in FIG. 24 is identifiable by that part of the cover layer 9 or 10, respectively, that is indicated by dashed lines, the first cover layer 9 and the second cover layer 10 can even extend up to the rear side 6 of the two-dimensionally extending decorative element 4 such that said rear side 6 is covered by the first and by the second cover layer 9, 10. In the case of fastening means 21 being attached or molded to the decorative element 4, said fastening means 21 are advantageously not covered by the first cover layer 9 or by the second cover layer 10.

Figure 22:
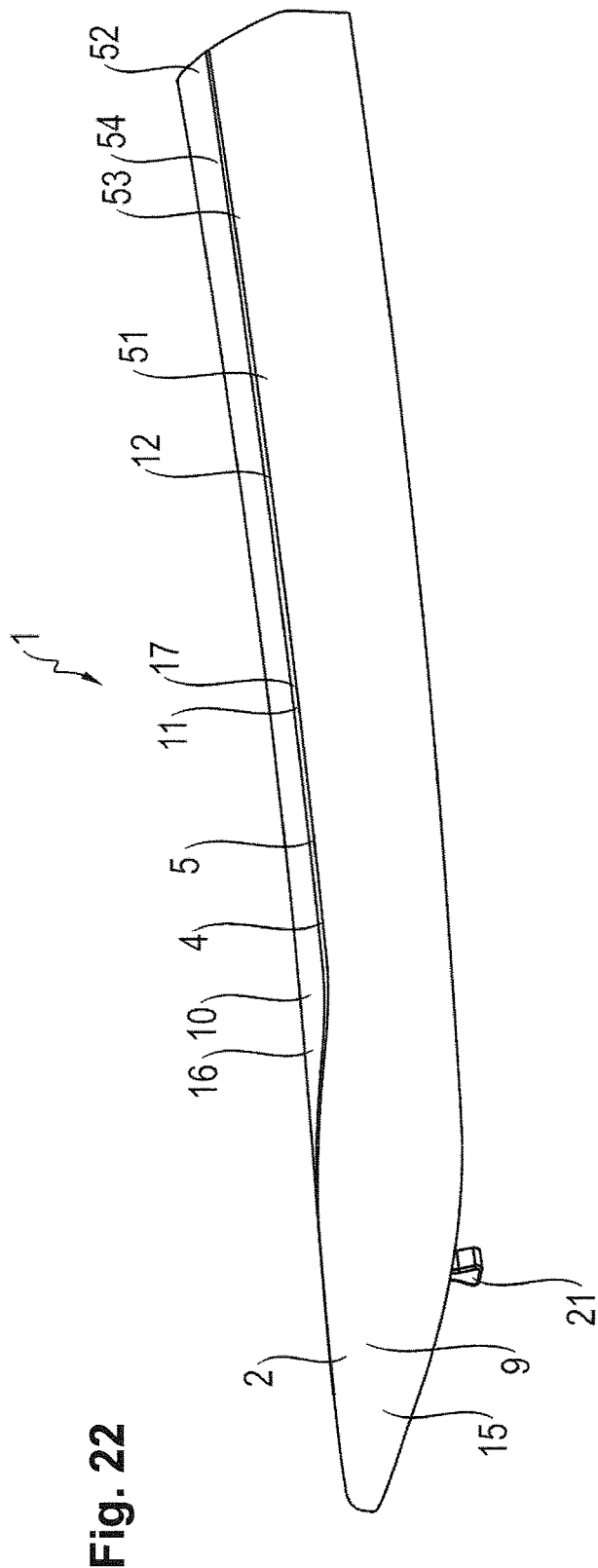
FIG. 22 schematically shows a spatial view of a fourth embodiment of a component according to the invention.
Figure 23:
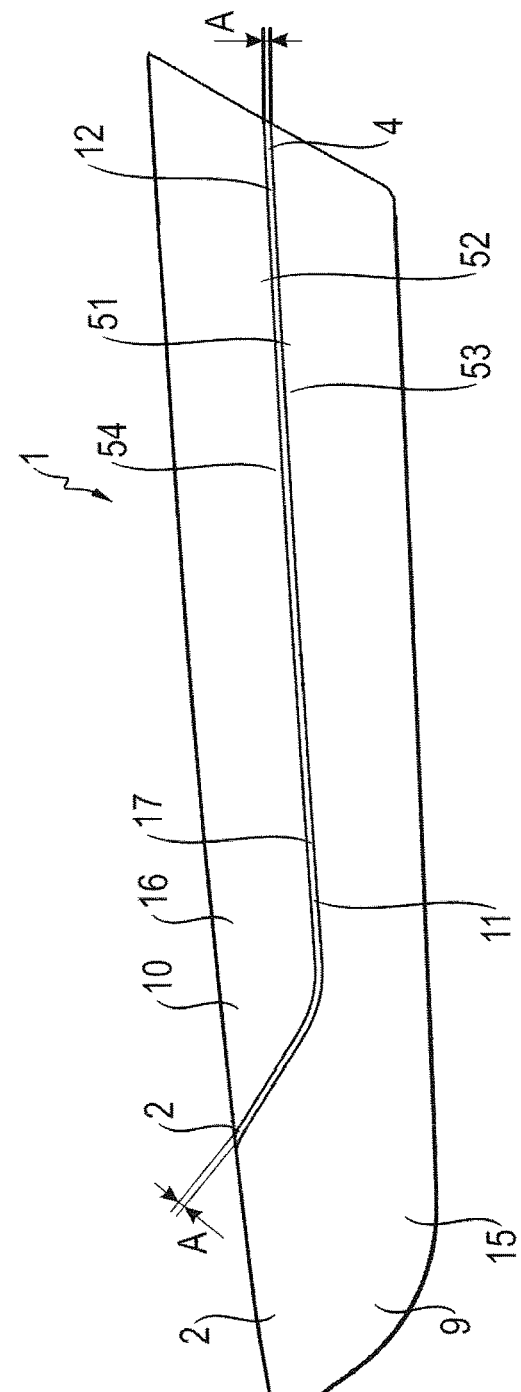
FIG. 23 schematically shows a plan view of the component according to FIG. 22.
Figure 26:
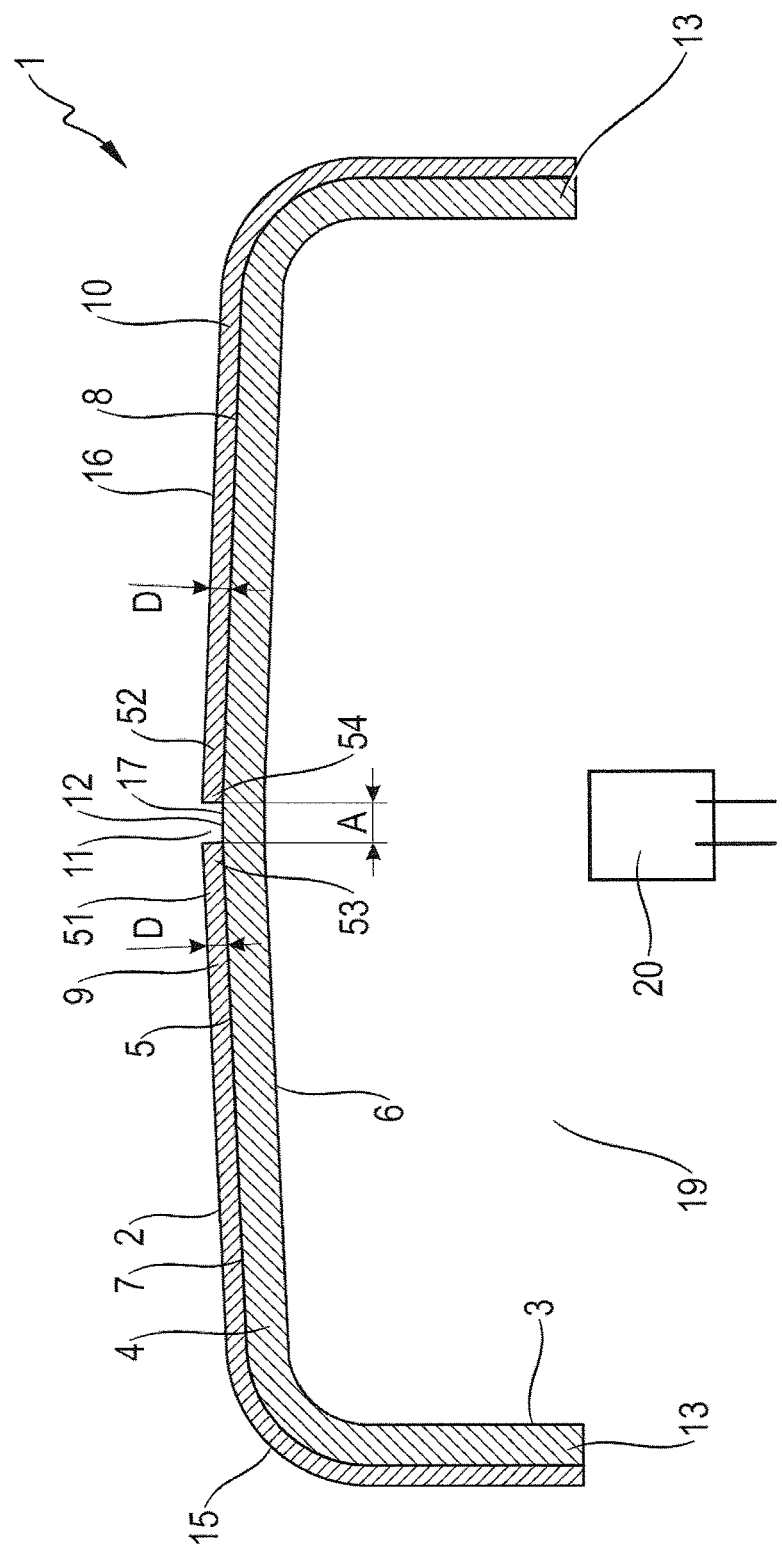
FIG. 26 schematically shows a greatly enlarged cross-section of a fifth embodiment of a component according to the invention.

A fifth embodiment of a component according to the invention is schematically shown in the cross-section in FIG. 26. As opposed to the embodiment of FIGS. 1 to 4, the first cover layer 9 and the second cover layer 10 here extend so as to be flush up to the end face of the two-dimensionally extending decorative element 4 that is formed by the periphery 13. The spatial view and the plan view of the component of this fifth embodiment from the front correspond to the views of the fourth embodiment that are shown in FIGS. 22 and 23, respectively. The front side 5 of the two-dimensionally extending decorative element 4 in the plan view of the visible side 2 of the component 1 is thus only still visible in the region of the gap 11. On account thereof, the component 1 achieves a particularly esthetic effect, and the two-dimensionally extending decorative element 4, on account thereof, is moreover well protected against environmental influences in the region of the periphery 13 thereof.

The above invention is of course not limited to the embodiments described, and a multiplicity of modifications is possible. For example, the component 1 according to FIGS. 1 to 4 can have a protective layer which covers at least a part-region of the visible side 2 of the component 1. This protective layer is preferably produced from a translucent material. Of course, the method for the production of the component 1 according to FIGS. 5 to 12 can accordingly be modified in such a manner, for example, that the second embodiment of the component 1 according to FIG. 12 likewise has a protective layer that is preferably produced from a translucent material and that is disposed on at least a part-region of the visible side 2 of the component 1 according to FIG. 12.

Moreover, the component 1 according to FIGS. 1 to 4, instead of the two cover layers 9, 10, can have three or more than three cover layers which according to the invention are completely spaced apart from one another on the visible side 2 of the component 1, or in the plan view of the visible side 2 of the component 1, respectively. Accordingly, the method for the production of the component 1 according to FIGS. 5 to 12 can be modified in such a manner, for example, that the resulting component 1 according to FIG. 12, instead of the cover layers 9, 10, has three or more than three cover layers which according to the invention are completely spaced apart from one another on the visible side 2 of the component 1, or in the plan view of the visible side 2 of the component 1, respectively. Accordingly, the method for the production of the component 1 according to FIGS. 13 to 20 can likewise be modified in such a manner, for example, that the resulting component 1 according to FIG. 20, instead of the cover layers 9, 10, has three or more than three cover layers which according to the invention are completely spaced apart from one another on the visible side 2 of the component 1, or in the plan view of the visible side 2 of the component 1 respectively. A multiplicity of further modifications is possible.

The invention claimed is:

1. A method for the production of a component, said method comprising the following steps:

providing a two-dimensionally extending decorative element produced by means of an injection-molding method and having a front side, a rear side and a periphery; and disposing in each case a cover layer directly on at least two regions of the front side of the provided two-dimensionally extending decorative element in such a manner that the at least two cover layers are completely spaced apart from one another, wherein the at least two cover layers and at least one additional region of the front side of the two-dimensionally extending decorative element conjointly form a visible side of the component, and wherein the disposal of at least one cover layer of the at least two cover layers on a region of the front side of the provided two-dimensionally extending decorative element is carried out by disposing a cover element on the region of the provided two-dimensionally extending decorative element by means of an injection-molding tool and such that the cover element conjointly with the region forms a cavity and by incorporating a free-flowing plastics, the plastics being a lacquer, into the cavity formed, such that the cover layer formed by the lacquer terminates so as to be flush with the periphery of the two-dimensionally extending decorative element or even extends up to the rear side of the two-dimensionally extending decorative element.

2. The method as claimed in claim 1, wherein the rear side of the two-dimensionally extending decorative element is impinged with gas during the provision of the two-dimensionally extending decorative element by means of the injection-molding method.

3. The method as claimed in claim 1, wherein the disposal of at least one further cover layer of the at least two cover layers on a further region of the front side of the provided two-dimensionally extending decorative element is carried out by disposing at least one further cover element on the further region of the provided two-dimensionally extending decorative element, such that the further cover element conjointly with the further region forms a further cavity and by incorporating a free-flowing material into the further cavity formed, such that the further cover layer is formed by the material on the further region.

4. The method as claimed in claim 1, wherein the disposal of at least one further cover layer of the at least two cover layers on a further region of the front side of the provided two-dimensionally extending decorative element is carried out by disposing a prefabricated cover layer on the further region of the provided two-dimensionally extending decorative element.

5. The method as claimed in claim 1, wherein the cover element is additionally disposed on at least a part-region of the front side of the two-dimensionally extending decorative element, wherein a respective part-region includes at least that region on which a respective prefabricated cover layer is disposed such that at least the prefabricated cover layer conjointly with the cover element forms a cavity, and wherein a free-flowing material is incorporated into the cavity formed such that a protective layer is formed at least on the prefabricated cover layer.

6. The method as claimed in claim 1, wherein the cover element is a component part of an injection-molding tool, wherein the injection-molding tool has a first mold part and a second mold part, wherein the first mold part forms the cover element.

7. The method as claimed in claim 1, wherein at least one cover layer is produced from an opaque material.

8. The method as claimed in claim 1, wherein at least one respective cover layer is configured so as to be at least partially raised in relation to a region of the front side of the two-dimensionally extending decorative element, said region at least partially bordering the respective cover layer.

9. The method as claimed in claim 1, wherein the two-dimensionally extending decorative element is configured so as to be translucent or opaque.

10. The method as claimed in claim 1, wherein at least one fastening means for fastening the component to a motor vehicle is integrally molded to the two-dimensionally extending decorative element.

11. The method as claimed in claim 1, wherein at least one layer is disposed on the rear side of the two-dimensionally extending decorative element, and wherein the layer is produced from an opaque material or from a translucent material.

12. The method as claimed in claim 1, wherein at least one illumination means is disposed in such a manner that the rear side of the two-dimensionally extending decorative element can be backlit by means of the illumination means.

13. The method as claimed in claim 1, wherein the cover layers on the at least two regions of the front side of the two-dimensionally extending decorative element conjointly cover at least 50% of the area of the front side of the two-dimensionally extending decorative element.

14. The method as claimed in claim 7, wherein the opaque material is metal or plastics.

15. The method as claimed in claim 10, wherein the two-dimensionally extending decorative element is produced from plastics.

16. The method as claimed in claim 1, wherein the two-dimensionally extending decorative element is produced by means of a variotherm injection-molding method.

17. A method for the production of a component, said method comprising the following steps:

providing a two-dimensionally extending decorative element produced by means of an injection-molding method and having a front side, a rear side and a periphery; and disposing in each case a cover layer directly on at least two regions of the front side of the provided two-dimensionally extending decorative element in such a manner that the at least two cover layers are completely spaced apart from one another, wherein the at least two cover layers and at least one additional region of the front side of the two-dimensionally extending decorative element conjointly form a visible side of the component, and wherein the disposal of at least one cover layer of the at least two cover layers on a region of the front side of the provided two-dimensionally extending decorative element is carried out by disposing a cover element on the region of the provided two-dimensionally extending decorative element by means of an injection-molding tool and such that the cover element conjointly with the region forms a cavity and by incorporating a free-flowing plastics, the plastics being a lacquer, into the cavity formed, such that the cover layer formed by a lacquer extends so as to flush up to an end face of the two-dimensionally extending decorative element that is formed by the periphery of the two-dimensionally extending decorative element.

18. The method as claimed in claim 9, wherein the two-dimensionally extending decorative element is configured so as to be translucent, wherein the two-dimensionally extending decorative element that is configured so as to be translucent is produced from metal or plastics.

19. The method as claimed in claim 9, wherein the two-dimensionally extending decorative element is configured so as to be opaque, wherein the two-dimensionally extending decorative element that is configured so as to be opaque is produced from metal or plastics.

* * * * *